United States Patent [19]
Koizumi

[11] Patent Number: 5,533,000
[45] Date of Patent: Jul. 2, 1996

[54] DISK APPARATUS INCLUDING A DISK DRIVING MEMBER ADAPTED TO HOLD TWO DIFFERENT SIZE DISKS

[75] Inventor: Satoru Koizumi, Higashihiroshima, Japan

[73] Assignee: Sharp Kabushiki Kaisha, osaka, Japan

[21] Appl. No.: 186,458

[22] Filed: Jan. 25, 1994

[30] Foreign Application Priority Data

Mar. 19, 1993 [JP] Japan ................................. 5-060590

[51] Int. Cl.⁶ ............................................. G11B 33/02
[52] U.S. Cl. ............................ 369/270; 369/249; 369/256; 369/75.2
[58] Field of Search ................................. 369/270, 264, 369/271, 14, 75.2, 77.2, 249, 256, 77.1; 360/99.12, 109

[56] References Cited

U.S. PATENT DOCUMENTS

| | | | |
|---|---|---|---|
| 4,797,869 | 1/1989 | Hirano | 369/75.2 |
| 5,025,433 | 6/1991 | Van Huesden et al. | 369/44.14 |
| 5,054,015 | 10/1991 | Tsukihashi et al. | 369/258 |
| 5,164,929 | 11/1992 | Kurosawa et al. | 369/77.1 |
| 5,177,731 | 1/1993 | Tanaka et al. | 369/77.1 |
| 5,187,701 | 2/1993 | Verheyen | 369/75.2 |
| 5,289,451 | 2/1994 | Ashinuma et al. | 369/58 |

FOREIGN PATENT DOCUMENTS

| | | | |
|---|---|---|---|
| 518259 | 12/1992 | European Pat. Off. | 369/264 |
| 2254086 | 7/1975 | France | |
| 2443116 | 6/1980 | France | |
| 3429096 | 3/1985 | Germany | |
| 58-194181 | 11/1983 | Japan | 369/270 |
| 61-206961 | 9/1986 | Japan | |
| 62-248187 | 10/1987 | Japan | 369/264 |
| 03102672 | 4/1991 | Japan | 369/270 |
| 5-334782 | 12/1993 | Japan | |
| 85/04510 | 10/1985 | WIPO | |

Primary Examiner—Stuart S. Levy
Assistant Examiner—Kevin M. Watkins
Attorney, Agent, or Firm—Nixon & Vanderhye

[57] ABSTRACT

A turn table in an optical disk apparatus in accordance with the present invention is provided with a mount section for use in a mini disk (MD) at the top portion thereof and another mount section for use in a compact disk (CD) at the base portion thereof. This arrangement makes it possible to drive optical disks of different types by the use of the same turn table. Below the turn table, are installed an optical pickup and a base plate that is provided with switches for discriminating whether the MD in question is dedicated solely to reproduction use or is used for both recording and reproduction, and positioning pins for the MD. The optical pickup is also allowed to move in the radial direction of the disk by support members. The optical pickup, the support members and the base plate are integrally moved up and down between a station close to the MD and a station close to the CD. This arrangement eliminates the necessity of an adapter that enables optical disks of different types to be appropriately placed on the turn table, and makes the optical disk apparatus compact by integrating various mechanisms.

60 Claims, 24 Drawing Sheets

DISK APPARATUS INCLUDING A DISK DRIVING MEMBER ADAPTED TO HOLD TWO DIFFERENT SIZE DISKS

FIELD OF THE INVENTION

The present invention relates to a disk driving device which is used in disk apparatuses, such as for example optical disk players, that optically record and reproduce information, and which is capable of handling either a cartridge containing a disk inside the case thereof or a disk that is not contained in a case.

BACKGROUND OF THE INVENTION

Conventionally, compact disks (hereinafter, referred to as CDs) and compact disks of SP type (hereinafter, referred to as 8 cm-CDs) are known to the art as optical disks wherein information can be recorded in digital form. Recently, mini disks (hereinafter, referred to as MDs) have been developed as optical disks where information can be both recorded and reproduced in digital form.

These MDs, which are miniaturized by housing them in cartridges, are easier to handle as compared with CDs and 8 cm-CDs, and are convenient in compiling or other tasks because they make it possible to perform repeatable recording.

In such an optical disk, information is reproduced therefrom by scanning the information area by the use of an optical system, including an optical pickup and other devices, while driving the disk rotatively in a radial direction. The optical system is designed to be compatibly used for CDs, 8 cm-CDs and MDs.

As to the driving method for the rotation of the optical disk, after the raised portion of the turn table is fitted to the center hole of an optical disk, the optical disk is clamped onto the turn table, and the optical disk is rotated by rotating the turn table.

The inner diameters of the center-holes of CDs and 8 cm-CDs are set to the same size, while the inner diameter of MDs is smaller than that of CDs because of the compactness of MDs.

In order to use both of CDs and MDs compatibly in the same disk apparatus, it is of course proposed that two turn tables having different diameters be installed; however, this method causes the disk apparatus to become bulky. (Here, an explanation on 8 cm-CDs is omitted because they are placed on the same turn table as used in CDs). Accordingly, in order to solve the above problem, the inventors of the present invention have devised a disk apparatus which has a driving mechanism that is compatibly applied to both types of the disks by the use of one turn table.

In this disk apparatus, as shown in FIGS. 23 and 24, a lid 100 is installed so as to rotatively move on a fulcrum 100a such that the cabinet 126 can be opened and shut. Opening the lid 100 allows an MD 150 or a CD 160, which will be described later, to be placed on or removed from the apparatus. Inside the cabinet 126, is installed a mechanism-use chassis 106 for supporting the driving mechanism, and the turn table 101 for driving the MD 150 is installed virtually in the center of the mechanism-use chassis 106. Here, the MD 150 refers to an entire structure including a cartridge and an optical disk 150a contained in the cartridge.

Between the lid 100 and the turn table 101, are installed an MD holder 107 for use in the MD 150, which is thus capable of moving virtually in an up and down direction, and a CD-use adaptor 103 for driving a CD 160, which is designed to cover the turn table 101. Further, a disk weight 104 for stabilizing the driving of the CD 160 is installed above the CD-use adaptor 103.

The CD-use adaptor 103 is supported by an adaptor arm 102. The adaptor arm 102 is installed so as to rotatively move in the same manner as the lid 100 on a fulcrum 102a that is fixed to the back side of the lid 100. The fulcrum 102a is fixed in the proximity of the fulcrum 100a that is used for the lid 100. A holding section 102b is formed at the rotatable end of the adaptor arm 102, and the CD-use adaptor 103 is supported by this so as to freely rotate.

The CD-use adaptor 103 is formed into a virtual flange shape, and has a cavity section 103a inside it that is fitted with an MD mount section 101a of the turn table 101. A holding groove 103b is formed along the circumferential face of the CD-use adaptor 103, and is fitted with the holding section 102b.

Moreover, the CD-use adaptor 103 also has a function for keeping the recording surface of the CD 160 placed thereon and that of the MD 150 placed on the turn table 101 at the same level. With this arrangement, it is not necessary for an optical pickup (not shown) to alter its level depending on the recording surfaces of the MD 150 and the CD 160.

The following is an explanation on the inserting and removing processes of the MD 150 into and from the disk apparatus. When the lid 100 is open with respect to the cabinet 126, the MD 150 is inserted into the MD holder 107. When the lid 100 is closed, the MD holder 107 also rotates on the fulcrum 102a, thereby allowing the optical disk 150a inside the MD 150 to be placed on the MD mount section 101a.

Successively, a base plate 114 is raised, and main positioning pins 114d, fixed onto the base plate 114 in a protruding manner, have their tops inserted into holes of the MD 150, not shown. Thus, the MD 150 is accurately positioned.

Since a magnet 101b is installed on the top portion of the MD mount section 101a, the magnet 101b pulls down a suction plate 150b that is built in the MD 150. Thus, the optical disk 150a is clamped onto the MD mount section 101a. Then, the optical disk 150a rotates integrally with the turn table 101, thereby permitting a reproducing operation. In this case, the CD-use adaptor 103 and the disk weight 104 are withdrawn to home positions where they will not interfere with the placement of the MD 150.

When the lid 100 is opened, the turn table 101 is stopped, and the MD holder 107 pivots upward, thereby allowing the MD 150 to be removed therefrom.

Next, an explanation will be given on the inserting and removing processes of the CD 160 into and from the disk apparatus. When the lid 100 is open with respect to the cabinet 126, the user manually guides the CD-use adaptor 103 onto the MD mount section 101a, and locks the adaptor arm 102 by the use of a holding means, not shown.

Then, after placing the CD 160 onto the CD-use adaptor 103, the user manually shifts a disk-weight arm 105 rotatively, and overlaps the disk weight 104 that is held at the pivotal end thereof onto the CD 160.

At this time, since the magnet 104c of the disk weight 104 pulls down the suction plate 103c of the CD-use adaptor 103, the CD 160 is clamped onto the CD-use adaptor 103. In this case, the MD holder 107 is withdrawn to a position where it will not interfere with the placement or driving of the CD 160 so as not to cause any damage to the CD 160.

Thereafter, the lid 100 is closed, and the CD 160 rotates integrally with the turn table 101, thereby permitting a reproducing operation. In order to take out the CD 160, an operation that is reversed to the above is performed.

However, in the above-mentioned arrangement, upon driving the MD 150, it is necessary to withdraw the CD-use adaptor 103 and the disk weight 104, which are not used now, to the positions where they will not interfere with the placement and driving of the MD 150. Moreover, in order to simplify the arrangement, such home positions have to be provided above the MD 150 that is to be driven. This leads to the necessity of increasing the height of the lid 100 so as to make room for the recessed positions, thereby causing the disk apparatus to become bulky.

SUMMARY OF THE INVENTION

It is an objective of the present invention to provide an optical disk apparatus that enables optical disks of a plurality of types to be applied thereto by the use of a simple mechanism.

It is another objective of the present invention to provide an optical disk apparatus which achieves compactness by using an arrangement wherein optical disks of a plurality of types are placed on a turn table without the necessity of an adapter.

It is still another objective of the present invention to provide an optical disk apparatus which achieves compactness by using an arrangement wherein functions are integrated by cooperatively moving a plurality of mechanisms.

In order to achieve the above objectives, the features of the optical disk of the present invention include: a driving member for driving a disc-shaped first recording medium while contacting the circumferential edge of a first center hole of the first recording medium as well as for driving a disc-shaped second recording medium while contacting the circumferential edge of a second center hole of the second recording medium, the first center hole being arranged to have a diameter smaller than that of the second center hole, the driving member being provided with a rotation axis, the first and second recording media being simultaneously held by the driving member at the respectively different stations of the rotation axis of the driving member.

With the above arrangement, the driving member contacts the first recording medium and the second recording medium respectively, and drives them at the respectively different stations of its rotation axis. In other words, the first and second recording media are supported by the same driving member without interfering with each other. Therefore, the driving member is capable of supporting recording media of a plurality of types that have center holes whose diameters are different from each other, without the necessity of an adapter. Consequently, since neither adapter nor mechanism for removing the adapter from the driving member when not used is needed, it is possible to make the optical disk apparatus compact.

Further, in order to achieve the above objectives, a medium holding means for housing and holding the first recording medium is provided in addition to the above arrangement. In this case, the medium holding means is arranged to move between the first station to which the first recording medium is removably inserted and the second station at which the first recording medium is placed on the driving member. Moreover, a driving-use hole is formed in the medium holding means so as to fit with the first center hole of the first recording medium, and the driving member is inserted through the driving-use hole so as to support the first recording medium at its top portion. In contrast, the second recording medium is supported by the driving member at a station which is different from the top portion with a predetermined distance from the medium holding means. This arrangement prevents the medium holding means and the second recording medium from interfering with each other. Therefore, the medium holding means makes it possible to easily insert and remove the first recording medium in and from the optical disk apparatus, as well as to easily hold the first recording medium on the driving member.

Furthermore, the optical disk apparatus of the present invention is provided with a reading means for reading out information by scanning a recording surface of either the first recording medium or the second recording medium. With this arrangement, the reading-out operation of information with respect to either the first recording medium or the second recording medium is carried out without being interrupted by the other recording medium.

In addition, the optical disk apparatus of the present invention may include the following means in addition to the above arrangement:

(1) a first support member for supporting the reading means so that it moves freely in the radial direction.

(2) a shifting means for shifting the reading means in parallel with the rotation axis by shifting the first support member in parallel with the rotation axis.

(3) a holding means for transmitting to the reading means a force for shifting the reading means in the radial direction by being geared to the reading means.

With the above arrangement, although the respective recording surfaces of the first recording medium and the second recording medium are at the different stations on the rotation axis of the driving member, information is read out from either the first recording medium or the second recording medium by shifting the reading means in parallel with the rotation axis using the shifting means.

In this case, the reading means is also moved in a radial direction by the first support member and the holding means. Here, the first support member is shifted in parallel with the rotation axis by the shifting means. Therefore, it is possible to integrate mechanisms for shifting the reading means in the radial direction as well as in parallel with the rotation axis, thus achieving compactness of the optical disk apparatus.

Further, the shifting means may be also provided with a cam means for converting the force that is exerted in the radial direction into a force which is exerted in parallel with the rotation axis, and for transmitting the force to the reading means.

This arrangement makes it possible to shift the reading means in parallel with the rotation axis by providing such a simple mechanism.

Moreover, in addition to the above arrangement, the optical disk apparatus of the present invention may be provided with a control means for controlling the shifting means in such a manner that the reading means is shifted to a station at which information is read from the second recording medium whenever a driving operation has been completed with respect to either the first recording medium or the second recording medium.

In the above arrangement, since the first recording medium is supported at the top portion of the driving member and the second recording medium is supported by the driving member below the first recording medium, the station at which the reading means reads information from the second recording medium is lower than the station at which the reading means reads information from the first recording medium. However, whenever a driving operation has been completed with respect to either the first recording medium or the second recording medium, the reading means is shifted to the station at which the reading means reads information from the second recording medium; this prevents the first recording medium from being damaged by accidental contact with the reading means upon placing the first recording medium on the driving means. Such a control operation is essential for the arrangement which enables recording media of a plurality of types to be placed on the same driving member.

In addition to the above arrangement, the optical disk apparatus of the present invention may be provided with a discrimination means for contacting the first recording medium so as to discriminate whether the first recording medium in question is dedicated solely to reproduction use or is compatibly used for recording and reproduction. In this case, the discrimination means is arranged to move together with the reading means by the shifting means so that it comes into contact with the first recording medium. With this arrangement, whenever a driving operation has been completed with respect to either the first recording medium or the second recording medium, the reading means and the discrimination means are simultaneously shifted to the station at which the reading means reads information from the second recording medium.

Consequently, since the type of the first recording medium is discriminated without the necessity of a complicated arrangement, the optical disk apparatus of the present invention enables recording media of more types to be compatibly applied thereto.

Further, the optical disk apparatus of the present invention may be provided with: a holding-state detection means for detecting the fact that the first recording medium is held by the medium holding means; a first detection means for detecting the fact that the medium holding means has been moved so that the first recording medium is placed on the driving member; and a second detection means for detecting the fact that the second recording medium is placed on the driving member.

With this arrangement, it becomes possible to provide control so that the reading means is shifted to the station at which the first recording medium is subjected to reading when only the first recording medium is placed on the driving member by the medium holding means. Moreover, whenever at least the second recording medium is placed on the driving member, control is provided so that the reading means is shifted to the station at which the second recording medium is subjected to reading. Furthermore, when both the first recording medium and the second recording medium are placed on the driving member, it is possible to provide control so that a warning is given to the user or the optical disk apparatus is maintained in the stopped state.

The various controlling operations described above are important for the optical disk apparatus that enables recording media of a plurality of types to be applied thereto, in order to improve its operability.

For a fuller understanding of the nature and advantages of the invention, reference should be made to the ensuing detailed description taken in conjunction with the accompanying drawings.

DESCRIPTION OF THE EMBODIMENTS

Referring to FIGS. 1 through 18, the following description will discuss one embodiment of the present invention.

Figure 1:
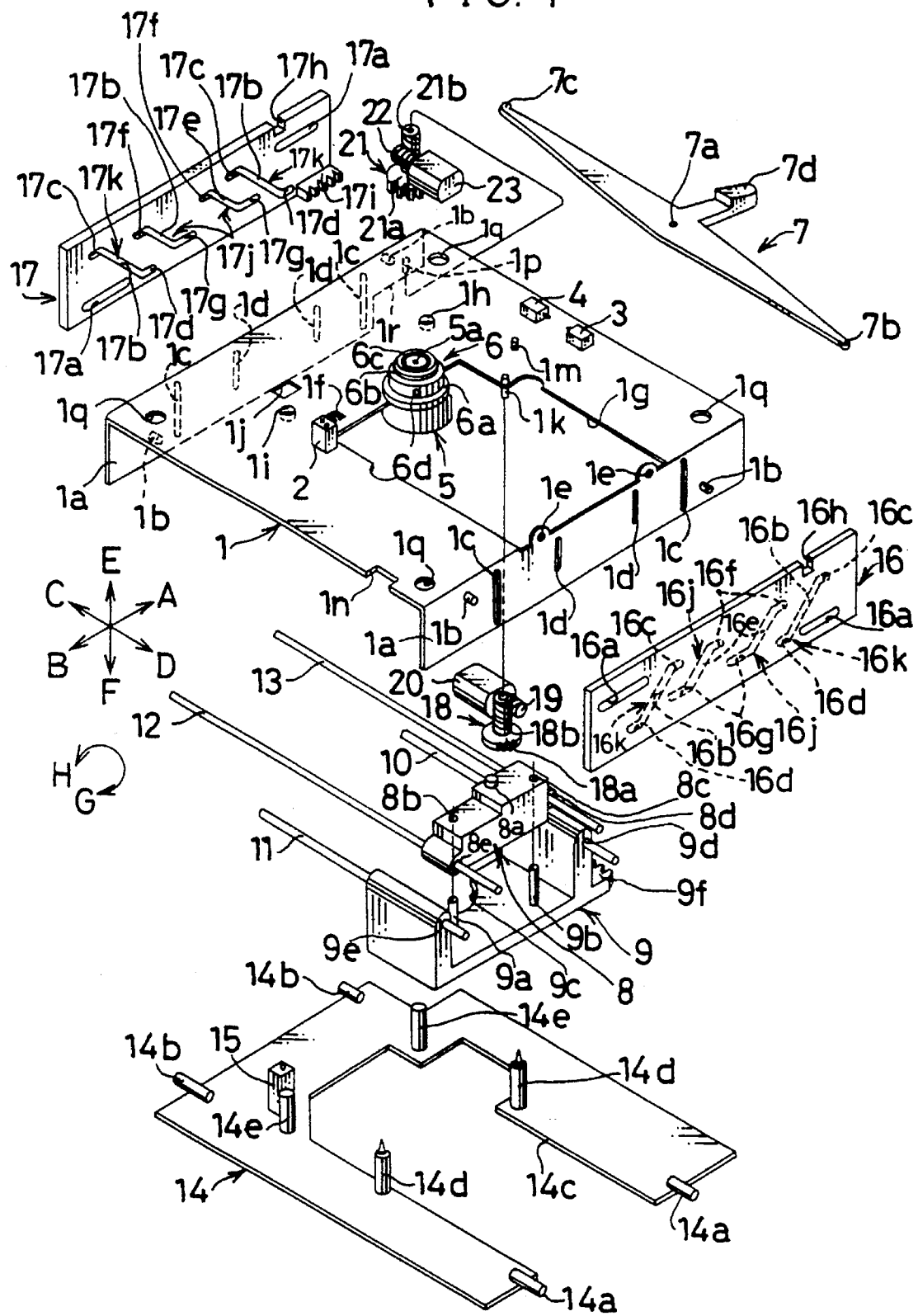
FIG. 1 is an exploded perspective view showing an optical disk apparatus and its driving mechanism of the present invention.
Figure 2:
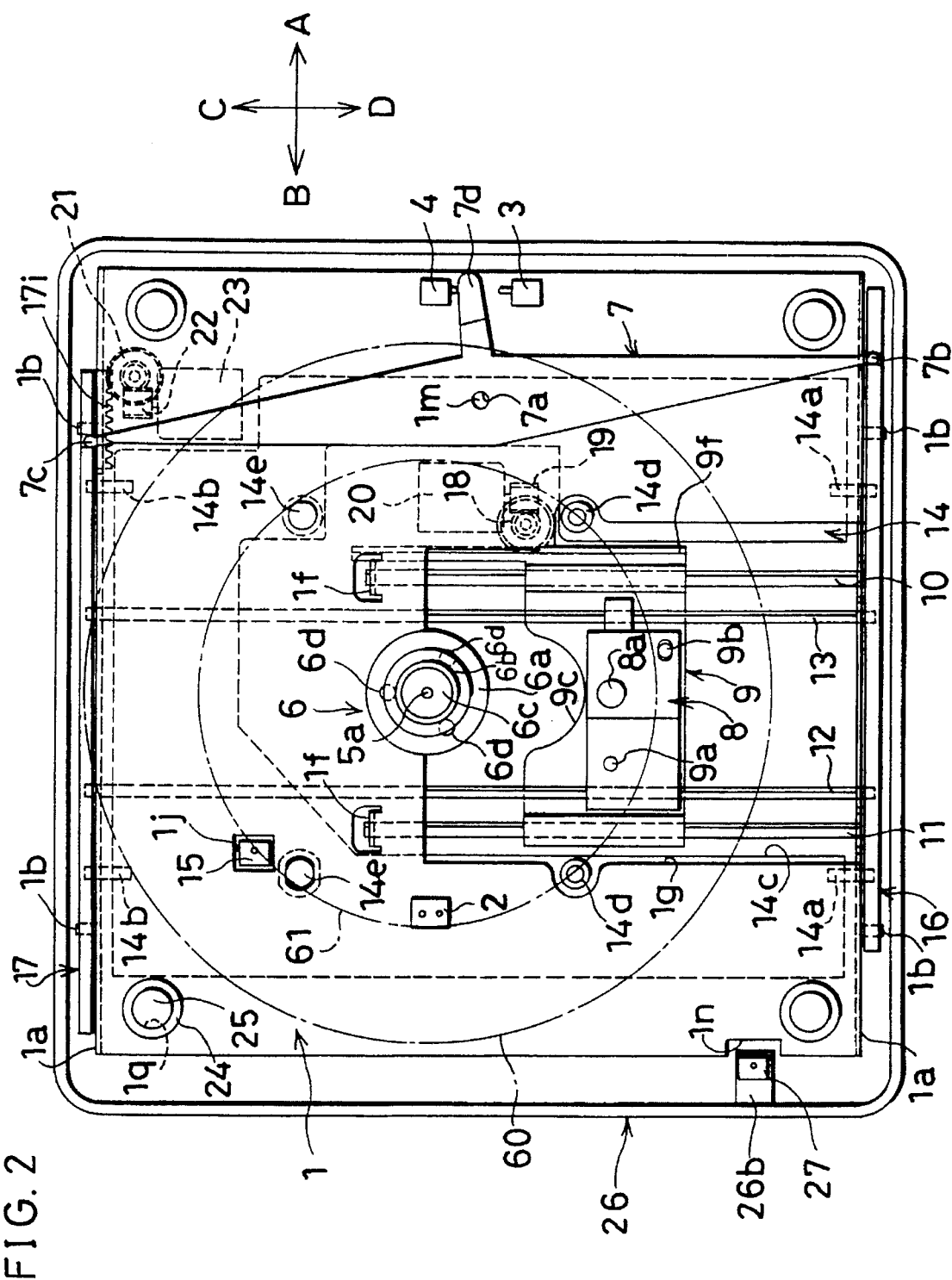
FIG. 2 is a plan view showing the driving mechanism in the CD mode.

Firstly, an explanation will be given on a driving mechanism in an optical disk apparatus. The driving mechanism is designed to rotatively drive an optical disk so as to execute recording and/or reproducing. As illustrated in FIGS. 1 and 2, a sub-chassis supports the driving mechanism.

Here, for convenience of explanation, these optical disks are classified into the first recording medium and the second recording medium: The first recording medium includes, for example, mini disks (hereinafter, referred to as MDs) each of which is consisted of a magneto-optical disk contained in a cartridge, and which allow repeatable recording. The second recording medium includes compact disks which are optical recording media (hereinafter, referred to as CDs) and 8 cm-CDs which are CDs of the SP type.

A pair of bent plates 1a of the sub-chassis 1 are formed by bending both ends of a flat plate downward, and positioned face to face virtually in parallel with each other in the direction of C-D shown in FIG. 1. To the bent plates 1a, are attached respective sliding plates (shifting means) 16 and 17, which will be described later, so as to be freely moved in the direction of A-B shown in FIG. 1. Here, the C-D direction is orthogonal to the A-B direction.

In order to permit the sliding plates 16 and 17 to freely move in the direction of A-B, a pair of guide shafts 1b are fixed to the outer sides of the bent plates 1a. Further, a pair of guide holes 16a are formed in the sliding plate 16, through which the guide shafts 1b are respectively inserted so as to be freely slide therein. Similarly, a pair of guide holes 17a are formed in the sliding plate 17, through which the guide shafts 1b are respectively inserted so as to be freely slide therein. The guide holes 16a and 17a are formed into an elongated shape in the direction of A-B.

In the virtually central portion of the sub-chassis 1, is installed a turn table (driving member) 6 having a virtually cylindrical shape in a protruding manner from the upper surface of the sub-chassis 1 so as to be freely rotated. Moreover, in the bent plates 1a, are formed a pair of guide holes 1c and a pair of guide holes 1d such that a base plate (discrimination-use shifting means) 14 and an optical pickup (reading means) 8, which will be described later, are supported so as to be freely moved in a direction of the rotation axis of the turn table 6, that is, in the direction of E-F. The guide holes 1c and 1d are shaped in an elongated form in the direction E-F.

In the upper face of the sub-chassis 1, is formed a cut-out section 1g in a virtually rectangular shape so as to permit the optical pickup 8 and a pickup-use base (holding means) 9 holding the pickup 8 to freely move. In the sub-chassis 1, a pair of fixing holes 1e and a pair of fixing holes 1f (see FIG. 2) are formed in such a manner as to sandwich the cut-out section 1g in the direction of C-D. A pair of guide shafts 10 and 11 are inserted through these fixing holes 1e and 1f, and fixed thereto. With this arrangement, the pickup-use base 9 is supported by the guide shafts 10 and 11 so as to be moved in the direction of C-D.

A main guide hole 1h and a sub guide hole 1i are formed in the upper face of the sub-chassis 1. A pair of sub positioning pins 14e are fixed to the base plate 14, and they are inserted through the main guide hole 1h and the sub guide hole 1i. Guided by the main guide hole 1h and the sub guide hole 1i, the base plate 14 is designed neither to be moved in the direction of A-B nor to be moved in the direction of C-D.

Moreover, a relief hole 1j is formed in the upper face of the sub-chassis 1 so that an MD-type discrimination switch (discrimination means) 15—which discriminates the types of MDs—is allowed to freely protrude or retreat through the hole 1j. At the edge of the cutout section 1g, a support shaft 1k is fixed downward. The support shaft 1k forms a rotary center axis for a transport gear 18, which will be described later. Likewise, in the proximity of the sliding plate 17 on the back face of the sub-chassis 1, a support shaft 1p is fixed downward. The support shaft 1p forms a rotary center axis for a transport gear 21, which will be described later.

Furthermore, a fulcrum axis 1m is fixed on the upper face of the sub-chassis 1 a predetermined distance away from the central position thereof in the A-direction. The fulcrum axis 1m forms a rotary center axis for a coupling arm 7 for coupling the sliding plates 16 and 17 to each other.

Here, the B-direction is defined as a front direction of the sub-chassis 1 and the A-direction is defined as a rear direction of the sub-chassis 1. In the proximity of the sliding plate 16 at the front end of the sub-chassis 1, a switch-use cutout section 1n is formed. A closed-lid confirming switch (not shown), which will be described later, is exposed out of the upper face of the sub-chassis 1 through this switch-use cutout section 1n. At the rear end of the bent plate 1a on the sliding plate 17 side, is formed a rack-use cutout section 1r. A rack section 17i, which is located at the lower portion of the rear end of the sliding plate 17, is allowed to move in the direction of A-B within the rack-use cutout section 1r.

Figure 3:
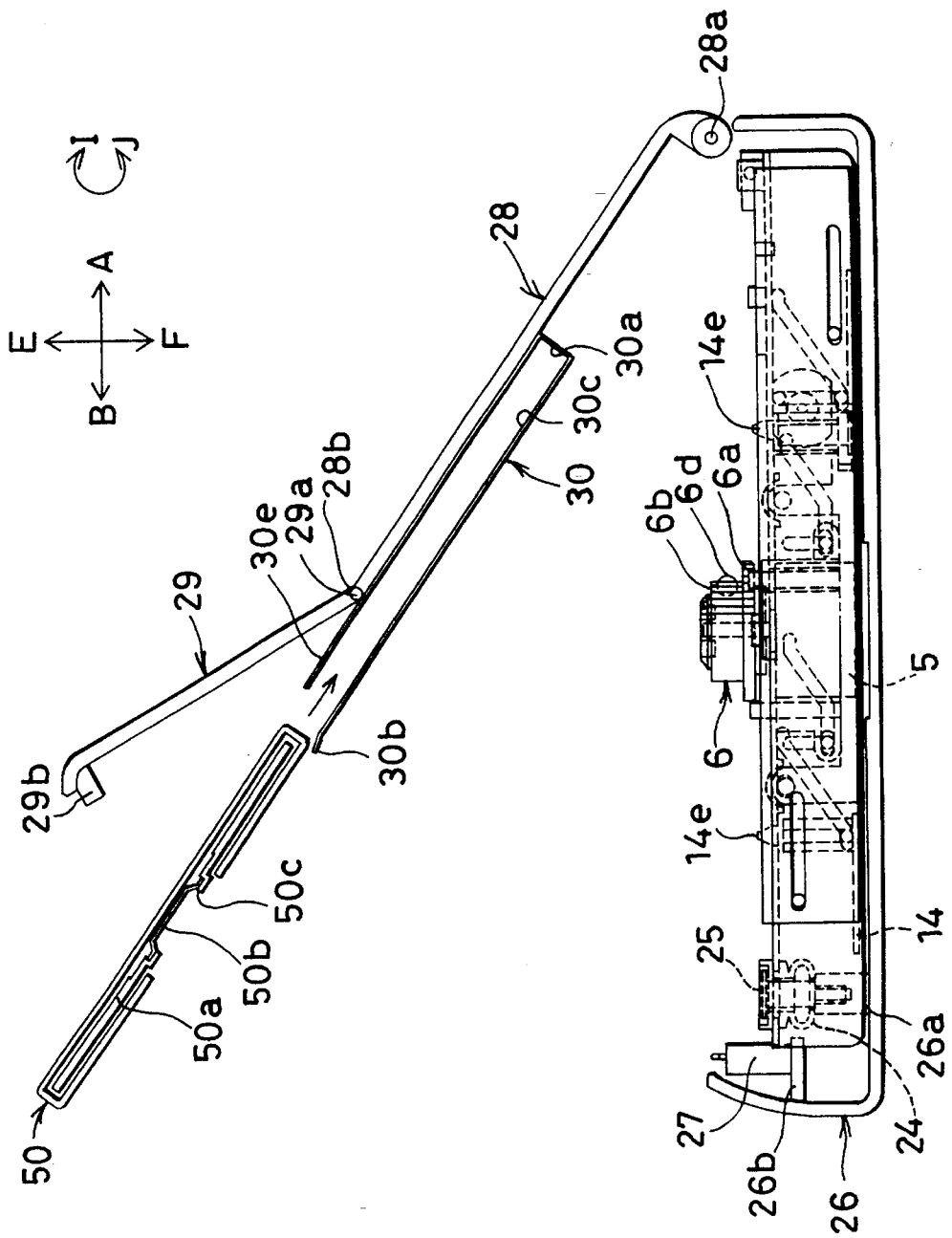
FIG. 3 is a side view showing an essential part of the optical disk apparatus in the open-state.
Figure 4:
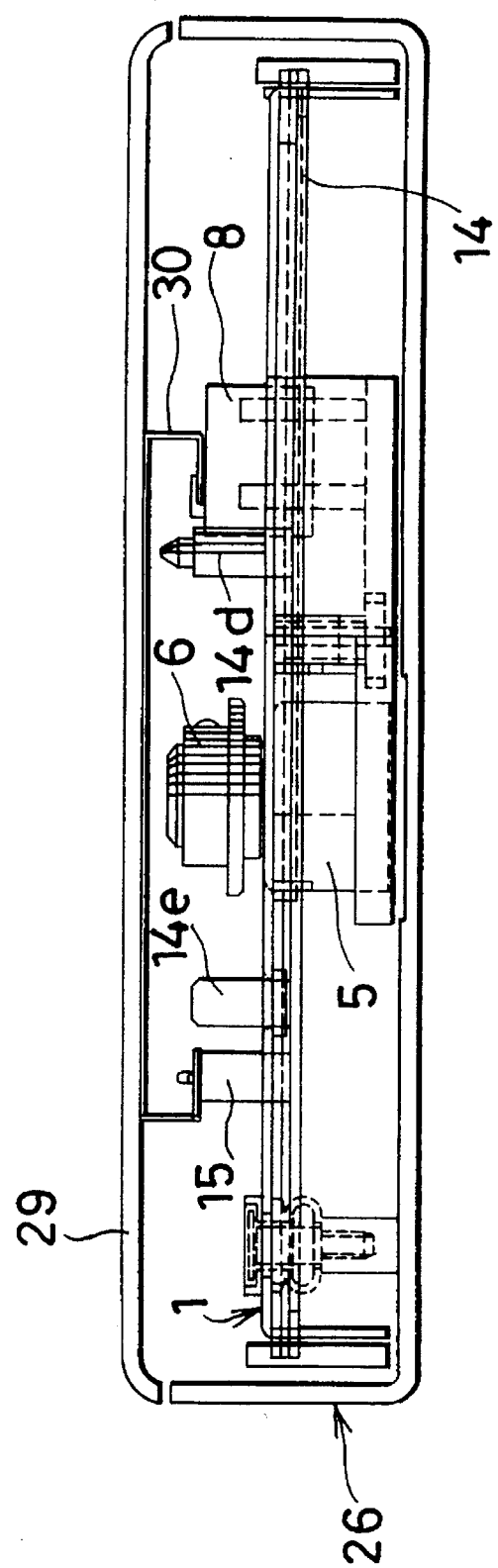
FIG. 4 is a front view showing an essential part of the optical disk apparatus, wherein its base plate is raised.
Figure 5:
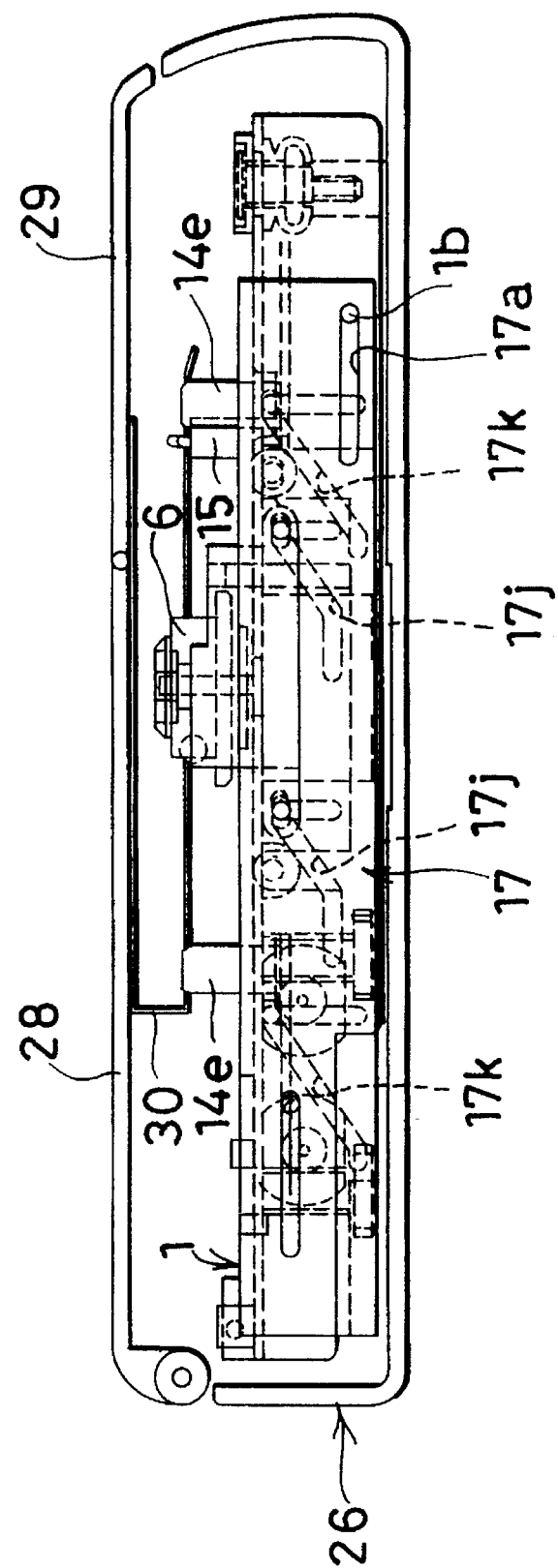
FIG. 5 is a side view of the essential part showing a state where the base plate of the optical disk apparatus is raised.
Figure 6:
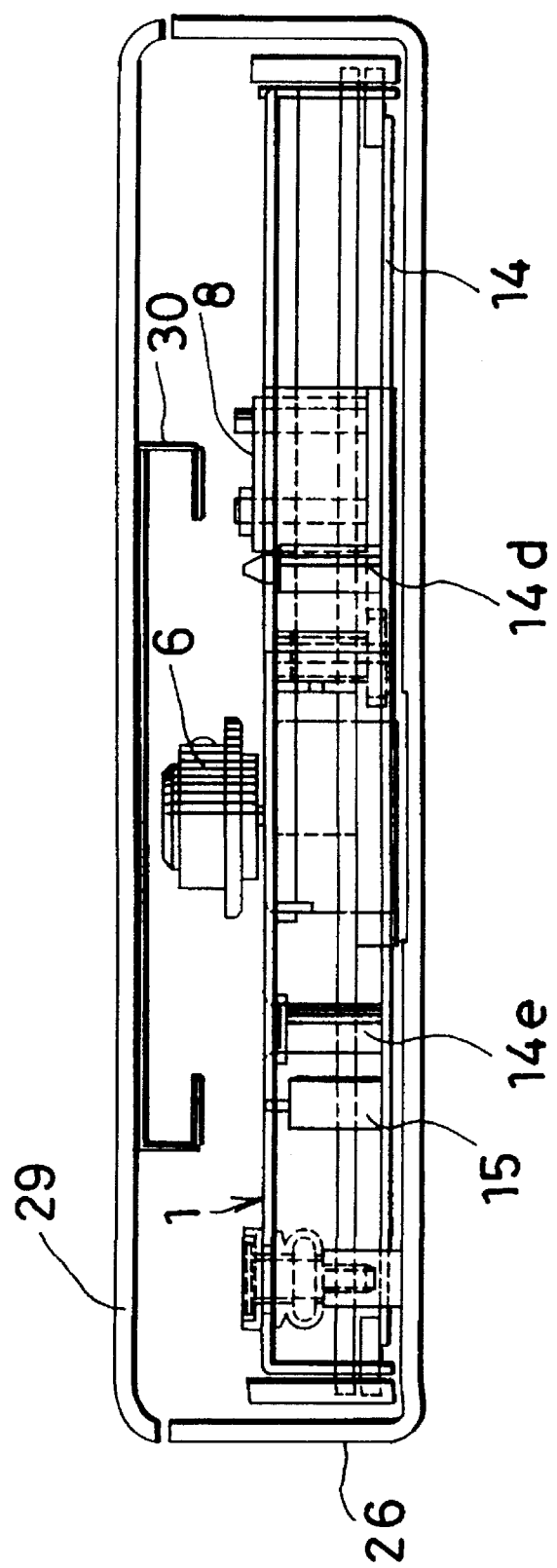
FIG. 6 is a front view of the essential part showing the state where the base plate of the optical disk apparatus is lowered.
Figure 7:
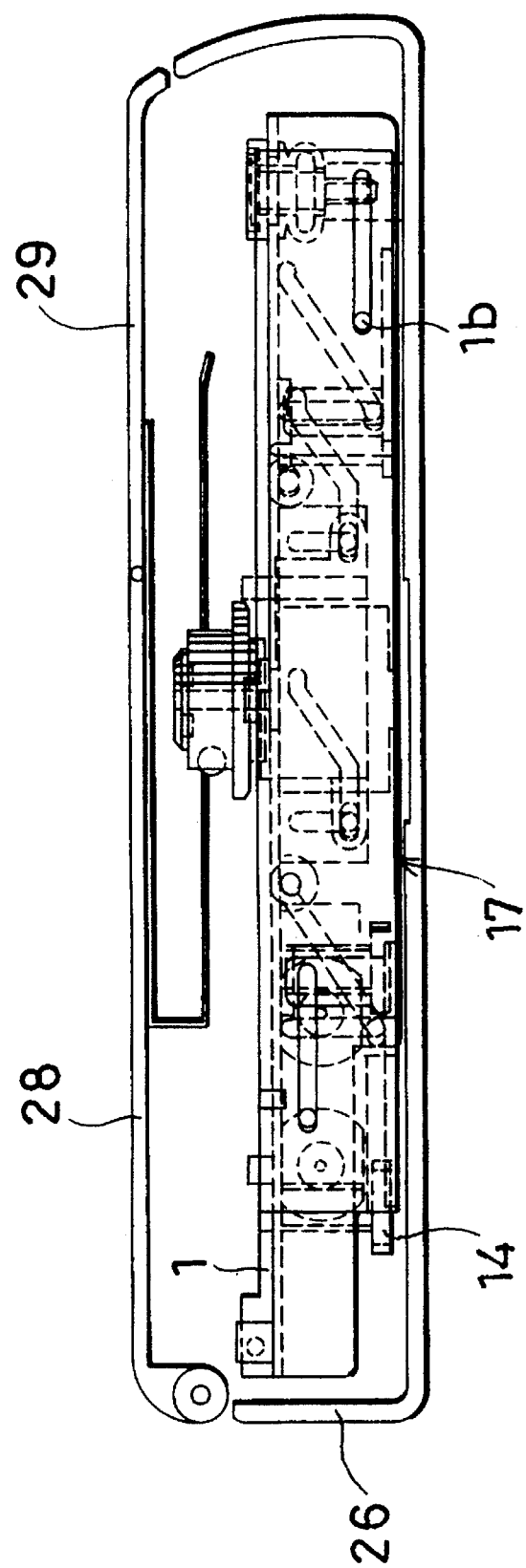
FIG. 7 is a side view of the essential part showing a state where the base plate of the optical disk apparatus is lowered.

Moreover, at the four corners of the upper face of the sub-chassis 1, are formed fixing orifices 1q that are used for fixing vibration control rubbers, which will be described later. As shown in FIG. 3, a fixing boss 26a is fixed to a cabinet 26 (lower frame) in a protruding manner. The sub-chassis 1 is fixed to the cabinet 26 by a machine screw 25 that is screwed into the fixing boss 26a through the fixing orifice 1q and the vibration control rubber 24. With this arrangement, it is possible to reduce the effects of external vibration that is transmitted to the optical pickup 8 through the cabinet 26.

Furthermore, as shown in FIGS. 1 and 2, a CD detection switch (second detection means) 2 is installed on the upper face of the sub-chassis 1. The CD detection switch 2 has a light emitting element and a light receiving element such as photo-interruptors, and is designed to determine which is placed on the turn table 6, a CD 60 or an 8 cm-CD 61, by detecting the presence or absence of the reflected light from the CD 60 or 8 cm-CD 61 that is placed on the turn table 6.

On the upper face of the sub-chassis 1, are installed a MD-mode detection switch (first mode detection means) 3 and a CD-mode detection switch (second mode detection means) 4, which are turned on and off by the pivotal movements of the coupling arm 7.

The MD-mode detection switch 3 is turned on when the coupling arm 7 pivots so as to allow the sliding plates 16 and 17 to be set in the MD mode, as will be described later. Likewise, the CD-mode detection switch 4 is turned on when the coupling arm 7 pivots so as to allow the sliding plates 16 and 17 to be set in the CD mode, as will be described later.

Moreover, in the central portion of the sub-chassis 1, is installed a spindle motor 5 which rotatively drives the turn table 6. The turn table 6 is fixed to the rotation axis 5a of the spindle motor 5, and the turn table 6 is thus arranged to rotate integrally with the rotation axis 5a.

Here, the turn table 6 is shaped to have virtually the same diameter as the inner diameter of the center hole (second center hole) of the CD 60 (for example, φ 15 mm). At the top portion of the turn table 6 is installed an MD mount section 6b (first table), and below the MD mount section 6b is installed a CD mount section 6a (second table). Additionally, the inner diameter of the center hole of the aforementioned 8 cm-CD 61 is the same as that of the center hole of the CD 60.

As shown in FIG. 3, the MD mount section 6b has a small-diameter section that is coaxial with the turn table 6. The diameter of the small-diameter section is the same as the inner diameter (for example, φ 11 mm) of the center hole (first center hole) 50c of an optical disk 50a contained inside the MD 50. Therefore, the small-diameter section is fitted into the center hole 50c, thus supporting the optical disk 50a, that is, the MD 50.

As shown in FIGS. 1 through 3, the CD mount section 6a is provided with a flange section that extends outward in the radial direction from the circumference of the turn table 6, and the CD 60 is placed on the flange section. Therefore, it is arranged that the CD 60 is passed through the MD mount section 6b, and placed onto the CD mount section 6a.

Even when the CD 60 is placed on the flange section and lids 28 and 29, which will be described later, are closed, a gap of approximately 2 mm is still kept between a raised section 30b in an MD holder 30, which will be described later, and the upper face of the CD 60. With this arrangement, not only the MD 50 but also the CD 60 can be placed onto the turn table 6, and is allowed to be driven.

Further, on the circumferential face of the turn table 6 between the CD mount section 6a and the MD mount section 6b, are disposed a plurality of balls 6d, for example, three of them, with equal intervals in the circumferential direction. Each ball 6d is designed to freely stick out or withdraw from the circumferential face of the turn table 6. In other words, each ball 6d is urged outward in the radial direction by a spring (not shown) or other members.

The CD 60 is sandwiched and held between the balls 6d and the CD mount section 6a. More specifically, when the CD 60 is placed onto the CD mount section 6a, the CD 60 first comes into contact with the balls 6d. As the CD 60 is further pushed downward, the balls 6d shift inside the turn table 6. When the CD 60 comes into contact with the CD mount section 6a, the balls return to the outside of the turn table 6, thereby pressing the CD 60 to the CD mount section 6a so as to be clamped thereon. Thus, it becomes possible to readily place and remove the CD 60 on and from the apparatus, thereby eliminating the necessity of the disk weight, which has been required in the conventional arrangements. Additionally, in the case of the 8 cm-CD 61, the quick placing and removing operations are available in the same manner as the CD 60.

A magnet 6c is attached to the top of the MD mount section 6b (see FIGS. 1 and 2). The magnet 6c pulls up the suction plate 50 that is built in the MD 50 in such a manner that the optical disk 50a is clamped onto the turn table 6, thereby allowing both the turn table 6 and the the optical disk 50a to be integrally rotated.

The fulcrum axis 1m is inserted into a fulcrum hole 7a that is formed in the central portion of the coupling arm 7 so as to allow the coupling arm 7 to be freely rotated. Further, a coupling section 7b, which is one of the pivotal ends of the coupling arm 7, engages the coupling groove 16h of the sliding plate 16, and a coupling section 7c, which is the other pivotal end thereof, engages the coupling groove 17h of the sliding plate 17.

With this arrangement, as the sliding plate 17 is moved in the directions of A–B, the coupling arm 7 pivots. Since the pivotal movement of the coupling arm 7 is transmitted to the sliding plate 16, the sliding plate 16 is also moved in the reverse direction to the sliding plate 17.

A portion of the coupling arm 7 is formed into a pressing portion 7d, which is another pivotal end. In response to pivotal movements of the coupling arm 7, the pressing portion 7d turns on and off the MD-mode detection switch 3 and the CD-mode detection switch 4 in their corresponding modes.

In the optical pickup 8, a laser light beam is projected onto the recording surface of the CD 60 or other disks, and the reflected light beam is incident to an objective lens 8a. The objective lens 8a is driven in a focussing direction (in the directions of E–F), and thus controlled so as to read out information from the recording surface.

In the optical pickup 8, are formed a main height-guide hole (guide section) 8b and a sub height-guide hole (guide section) 8c in the direction of E–F. To the pickup-use base 9, are fixed a pair of height-guide shafts (guide section) 9a and 9b, which will be described later, in a sticking out manner in the E-direction. The height-guide shafts 9a and 9b are inserted through the guide holes 8b and 8c, thereby allowing the optical pickup 8 to slide freely in the directions of E–F. Thus, the optical pickup 8 is restricted in its movement in the horizontal direction with respect to the pickup-use base 9 (in the directions of A–B as well as C–D).

Further, in the optical pickup 8, are formed a main guide hole 8d and a sub guide hole 8c in the direction of C–D. A pair of guide shafts 12 and 13, which extend in the direction of C–D are inserted through the guide holes 8d and 8e in such a manner that the optical pickup 8 is allowed to slide freely in the directions of C–D. With this arrangement, as the guide shafts 12 and 13 move in an up and down direction (direction of E–F), the optical pickup 8 is moved in the same direction in response to the movement.

Moreover, a cut-out section 9c for contact-avoiding use, which has a virtually semi-circular shape, is formed in the pick-up-use base 9 so that it allows the pick-up-use base 9 to avoid contact against the spindle motor 5, even when the pick-up use base 9 is moved closest to the spindle motor 5.

A main guide hole 9d and a sub guide hole 9e are respectively formed in the front wall and the rear wall of the pick-up-use base 9 in the direction of C–D. Guide shafts 10 and 11, which extend in the direction of C–D, are inserted through the main guide hole 9d and the sub guide hole 9e in such a manner that the pick-up-use base 9 is allowed to slide freely in the direction of C–D. With this arrangement, the pick-up-use base 9 is capable of moving in the direction of C–D with respect to the recording surface of the CD 60 or other disks that is placed on the turn table 6, that is, in a direction parallel to the radial direction of the CD 60 or other disks.

Moreover, a pick-up-use rack section 9f extending in the direction of C–D is formed on one portion of the pick-up-use base 9. The pick-up-use rack section 9f and the shifting gear 18, which will be described later, cooperatively allow the optical pickup 8 to move in the direction C–D. Thus, information is read out from the MD 50, the CD 60, or the 8 cm-CD 61 by the optical pickup 8 which is allowed to move.

The guide shafts 10 and 11 are inserted through and fixed to the respective fixing holes 1e and 1f of the sub-chassis 1. Both ends of the guide shafts 12 and 13 are inserted through the respective guide holes 1d of the bent plates 1a so as to freely slide therein. Further, both ends of the guide shafts 12 and 13 are respectively inserted through the first cams 16j of the sliding plate 16 and the first cams 17j of the sliding plate 17.

The cams 16j and 17j are arranged to change the directions of movements of the sliding plates 16 and 17 from the direction of A–B to the direction of E–F that is the same direction as the guide shafts 12 and 13.

Each first cam 16j consists of an MD-use groove 16f and a CD-use groove 16g, both extending in the direction of A–B, and a slanting groove 16e that connects the grooves 16f and 16g. The MD-use groove 16f is located at a higher level than the CD-use groove 16g.

Meanwhile, each first cam 17j consists of an MD-use groove 17f and a CD-use groove 17g, both extending in the direction of A–B, and a slanting groove 17e that connects the grooves 17f and 17g. The MD-use groove 17f is located at a higher level than the CD-use groove 17g. Further, the cams 16j and 17j are disposed in virtually symmetrical with the rotation axis of the turn table 6.

Therefore, as the sliding plates 16 and 17 move, the guide shafts 12 and 13 are allowed to move in the direction of E–F while the guide shafts 12 and 13 are maintained in parallel with the sub-chassis 1. Such movements of the guide shafts 12 and 13 enable the optical pickup 8 to move a distance, for example, in the order of 6 mm in an up and down direction (in the direction of E–F) and to scan the MD 50, the CD 60, or the 8 cm-CD 61. Thus, the guide shafts 12 and 13 as well as the cams 16j and 17j constitute a height-switching mechanism in the optical pickup 8.

Meanwhile, the MD-type discrimination switch 15 is installed in the base plate 14. The MD-type discrimination switch 15 discriminates whether an MD 50 placed on the turn table 6 is the one dedicated solely to reproduction or the one used in both recording and reproduction, by detecting the presence or absence of the discrimination-use hole formed in the under face of the cartridge case of the MD 50.

Further, a pair of guide pins 14a are installed at the end of the base plate 14 on the sliding-plate 16 side in a protruding manner in the D-direction. A pair of guide holes 1c, which have an elongated shape in the direction of E–F, are formed in the bent plate 1a on the sliding-plate 16 side. The guide pins 14a are respectively inserted through the guide holes 1c.

Meanwhile, a pair of guide pins 14b are installed at the end of the base plate 14 on the sliding-plate 17 side in a protruding manner in the C-direction. A pair of guide holes 1c, which have an elongated shape in the direction of E–F, are also formed in the bent plate 1a on the sliding-plate 17 side. The guide pins 14b are respectively inserted through the guide holes 1c. This arrangement allows the base plate 14 to shift in the direction of E–F.

Moreover, the ends of the guide pins 14a are respectively inserted through a pair of second cams 16k that are formed in the sliding plate 16, and the ends of the guide pins 14b are respectively inserted through a pair of second cams 17k that are formed in the sliding plate 17. As the sliding plates 16 and 17 move, the second cams 16k and 17k allow the base plate 14 to move in an up and down direction (in the direction of E–F). That is, the base plate 14 moves upward in the MD mode, and moves downward in the CD mode.

Each second cam 16k, which has the same shape as the first cam 16j, consists of a slanting groove 16b, an MD-use groove 16c, and a CD-use groove 16d, while each second cam 17k, which has the same shape as the first cam 17j, consist of a slanting groove 17b, an MD-use groove 17c, and a CD-use groove 17d.

The base plate 14 is provided with an opening 14c that is cut out so as to allow the pickup-use base 9 to move freely. Further, a pair of main positioning pins 14d are installed in the proximity of the center of the base plate 14 so as to face each other in the direction of A–B with the opening 14c located in between. Moreover, a pair of sub positioning pins 14e are installed at the edge of the opening 14c that is closer to the sliding plate 17 so as to face each other in the direction of A–B with the opening 14c located in between.

The positioning pins 14d and 14e are designed to shift the MD 50 placed on the MD mount section 6b in the E-direction and support it while positioning it so as to be properly driven.

Further, the top portion of the main positioning pin 14d is formed into a tapered shape whose diameter narrows toward the top so as to ensure an accurate positioning of the MD 50. The sub positioning pins 14e are respectively inserted through the main guide hole 1h and the sub guide hole 1i of the sub-chassis 1. With this arrangement, as the sliding plates 16 and 17 move, the base plate 14 is allowed to move in the direction of E–F in parallel with the sub-chassis 1.

Here, an explanation will be given on the movements of the base plate 14 and the optical pickup 8 in the direction of E–F. Since the sliding plates 16 and 17 are cooperatively moved by the coupling arm 7, the sliding plate 16 is moved in the B-direction as the rack section 17i of the sliding plate 17 is moved, for example, in the A-direction by rotation of the shifting gear 21. At this time, the guide pins 14b of the base plate 14 rise along the slanting grooves 17b of the second cams 17k and reach the MD-use grooves 17c from the CD-use grooves 17d. The guide pins 14a of the base plate 14, on the other hand, rise along the slanting grooves 16b of the second cam 16k and reach the MD-use grooves 16c from the CD-use grooves 16d. Thus, the base plate 14 is moved in the E-direction in parallel with the sub-chassis 1.

As the rack section 17i of the sliding plate 17 is moved in the B-direction by rotation of the shifting gear 21, the base plate 14 is moved in the F-direction through the paths in the reverse manner.

As the sliding plates 16 and 17 move in the direction of A–B, both ends of the guide shafts 12 and 13, which are inserted through the optical pickup 8, slide along the first cams 16j and 17j in the same manner as the guide pins 14a and 14b. Therefore, simultaneously as the base plate 14 moves in the direction of E–F, the optical pickup 8 moves in the same direction, E–F, as the base plate 14.

As described above, the base plate 14 and the optical pickup 8 are moved in the direction of E–F in parallel with the sub-chassis 1. Further, the base plate 14 and the optical pickup 8 are shifted upward through the respective MD-use grooves 16c, 16f, 17c and 17f, and positioned at an MD-mode station (see FIGS. 4 and 5). In other words, the MD-mode station refers to a station where recording and/or reproduction are available on and from the MD 50. Conversely, the base plate 14 and the optical pickup 8 are shifted downward through the respective CD-use grooves 16d, 16g, 17d and 17g, and positioned at a CD-mode station (see FIGS. 6 and 7). In other words, the CD-mode station refers to a station where recording and/or reproduction are available on and from the CD 60.

In this case, the optical pickup 8 is shifted only by a distance corresponding to the difference in levels (first difference) between the recording surface of the CD 60 placed on the CD mount section 6a and that of the MD 50 placed on the MD mount section 6b. Therefore, the distance in the direction of E–F between the MD-use groove 16f or 17f and the CD-use groove 16g or 17g is set to the first difference.

The base plate 14 is shifted only by a distance corresponding to the difference in levels (second difference)

between the station where the main positioning pins 14*d* would not interfere with rotation of the CD 60 during the CD mode and the station where those pins 14*d* maintain the MD 50 so as to be properly driven during the MD mode. Therefore, the distance in the direction of E–F between the MD-use groove 16*c* or 17*c* and the CD-use groove 16*d* or 17*d* is set to the second difference.

Moreover, in the CD mode, the coupling arm 7 is rotated so that the sliding plate 16 moves in the A-direction, and allows the sliding plate 17 to shift in the B-direction. As a result, the CD-mode detection switch 4 is pushed by the pressing section 7*d* of the rotating coupling arm 7, and turned on. In the MD mode, the coupling arm 7 is rotated so that the sliding plate 16 moves in the B-direction, and allows the sliding plate 17 to shift in the A-direction. As a result, the MD-mode detection switch 3 is pushed by the pressing section 7*d*, and turned on.

Furthermore, to the support shaft 1*k* of the sub-chassis 1 is fixed the shifting gear 18 so as to freely rotate in order to drive the pickup-use base 9. The shifting gear 18 is provided with a flat gear 18*a* and a worm wheel 18*b* which are integrally rotated.

The flat gear 18*a* is meshed with the rack section 9*f* of the pickup-use base 9, and the worm wheel 18*b* is meshed with a worm gear 19 that is fixed to a base-shifting motor 20. Therefore, the pickup-use base 9 is moved in the direction of C–D by the base-shifting motor 20.

Further, to the support shaft 1*p* of the sub-chassis 1 is fixed the shifting gear 21 so as to freely rotate. The shifting gear 21 is provided with a flat gear 21*a* and a worm wheel 21*b* which are integrally rotated.

The flat gear 21*a* is meshed with the rack section 17*i* of the sliding plate 17, and the worm wheel 21*b* is meshed with a worm gear 22 that is fixed to a mechanical-mode-use motor 23. Therefore, the optical pickup 8 and the base plate 14 are moved in the direction of E–F by the mechanical-mode-use motor 23.

Next, an explanation will be given on an arrangement of the disk apparatus other than the driving mechanism. As illustrated in FIG. 3, in the disk apparatus, there is installed a cabinet 26 having a U shaped cross-section, and the driving mechanism is disposed in the cabinet 26.

Further, the lids 28 and 29 are attached to the cabinet 26 so as to freely pivot. The lid 28 is installed so that it is capable of pivoting clockwise (in the I-direction in FIG. 3) as well as counterclockwise (in the J-direction in FIG. 3) around a fulcrum 28*a* that is fixed to the rear end of the cabinet 26. A fulcrum 28*b* and a fulcrum 29*a* are fixed to the pivotal end of the lid 28 so that they are capable of pivoting thereon. The lid 29 is allowed to freely pivot on the fulcrum 29*a*. The lids 28 and 29 are urged counterclockwise (in the I-direction in FIG. 3) by respective urging means, not shown.

The angle of rotation to bring the lid 28 to an open state is determined by rotation-restricting members, not shown, so as to allow the CD 60 to be easily inserted therein and removed therefrom. The angle of rotation to bring the lid 29 to an open state is also determined by the same members so as to allow the MD 50 to be easily inserted therein and removed therefrom.

A switch fixing section 26*b* is installed on the inner face of the front panel inside the cabinet 26. A closed-lid confirming switch 27 for confirming the closed state of the lid 29 is fixed to the switch fixing section 26*b*. The closed-lid confirming switch 27 is turned on when it comes into contact with a switch pressing section 29*b* that is fixed to the pivotal end of the lid 29.

Figure 8:
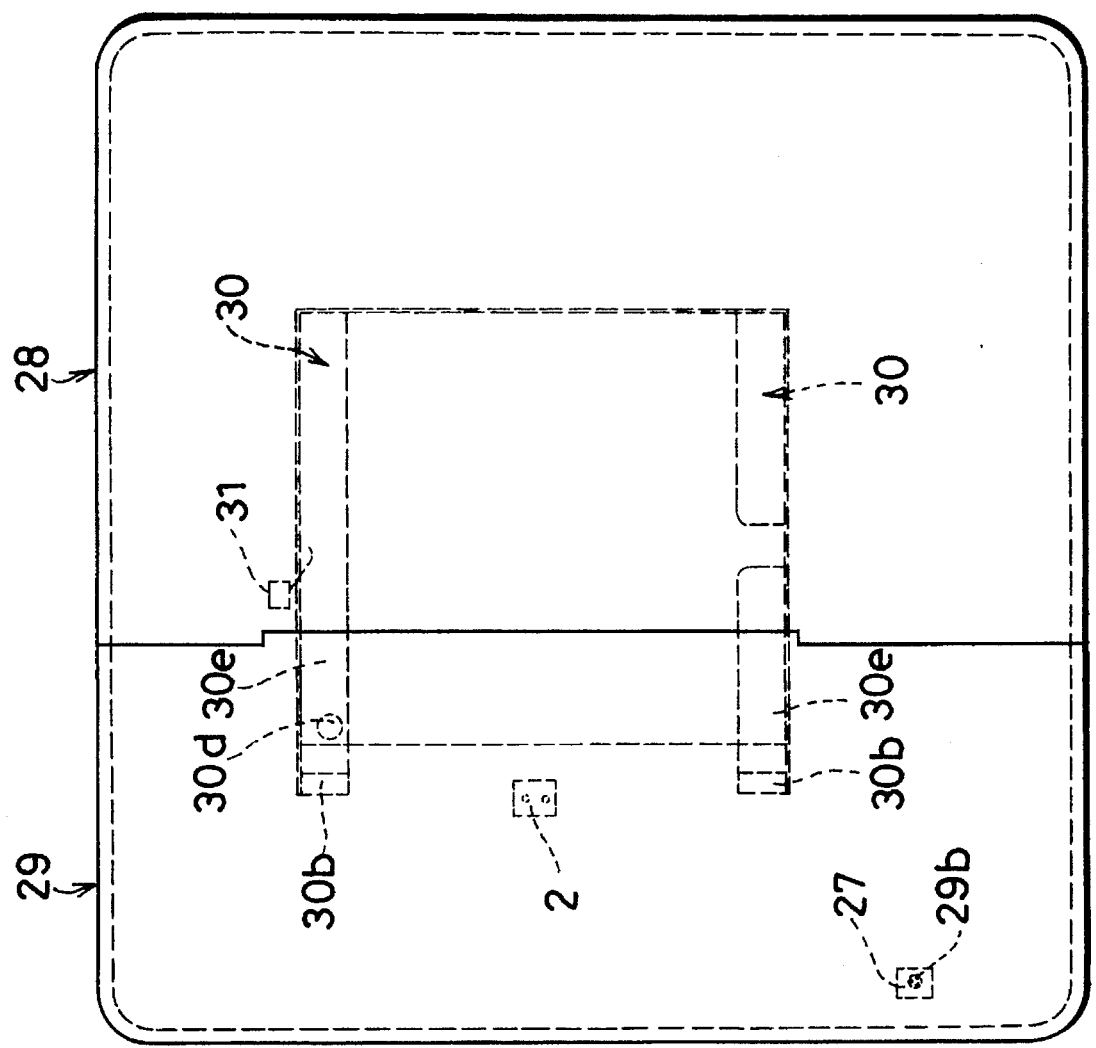
FIG. 8 is a plan view showing a lid which mainly consists of two parts.

As illustrated in FIGS. 3 and 8, an MD holder 30 for holding the MD 50 is attached to the back face of the lid 28. The MD holder 30, which is made of flexible thin plates, is formed into a box shape having an insert-use opening. The MD holder 30 is further provided with a contacting section 30*a* for holding the MD 50 inserted thereto by sandwiching both sides thereof as well as positioning the MD 50 at a predetermined station, and a holding section 30*c* for holding the upper face and lower face of the inserted MD 50 in a sandwiched manner.

The bent section 30*b* for guiding the MD 50 to be inserted is formed at the insert-use opening of the MD holder 30. The top of the bent section 30*b* is slightly bent toward the sub-chassis 1 side. Additionally, in the MD holder 30 are installed well-known mechanisms such as an opening and closing mechanism for the shutter of the MD 50 and an urging mechanism for pressing the MD 50 downward, that is, in the F-direction.

As illustrated in FIG. 8, an MD detection switch (first detection means) 31 is installed in the proximity of the MD holder 30, and when the MD 50 is inserted into the MD holder 30, it is turned on, thereby detecting the insertion of the MD 50. Further, in the lower face of the MD holder 30, is formed a switch-use hole 30*d* that allows the MD-type discrimination switch 15 to pass therethrough.

Figure 11:
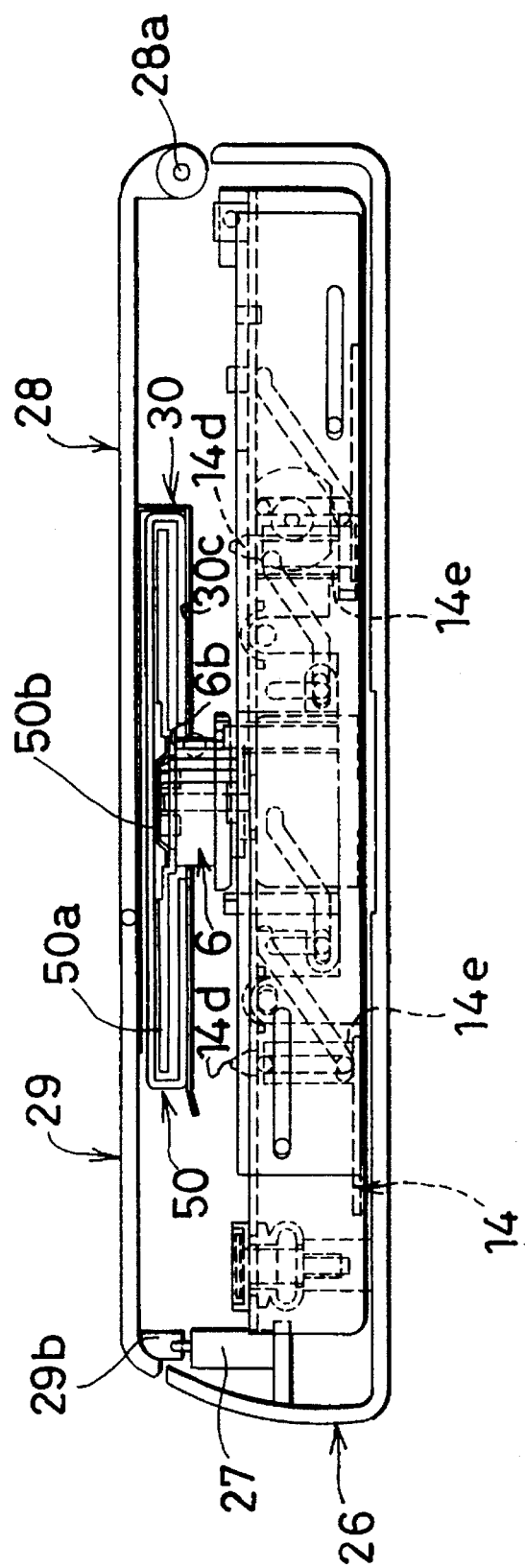
FIG. 11 is a side view of the essential part showing a state where the MD is placed into the optical disk apparatus.

As illustrated in FIGS. 3 and 8, a contacting section 30*e*, which extends from the lower face of the lid 28 toward the lid 29, is formed on the upper face of the MD holder 30. With this arrangement, when the lid 29, which is in the open state, is manually pressed downward, it rotates counterclockwise, and comes into contact with the contacting section 30*e*; therefore, the pivotal movement is restricted. When the lid 29 is further pressed downward manually, the lids 28 and 29 are integrally rotated counterclockwise around the fulcrum 28*a*, thereby entering the closed state as shown in FIG. 11. In this case, the lids 28 and 29 are maintained in the closed state by the locking operation of a locking means, not shown.

When the lids 28 and 29 have been locked, the switch pressing section 29*b* turns the closed-lid confirming switch 27 on. The closed-lid confirming switch 27 is arranged to release a signal indicating the closed state of the lids 28 and 29 to a control device (control means, completion detection means), which will be described later.

Figure 9:
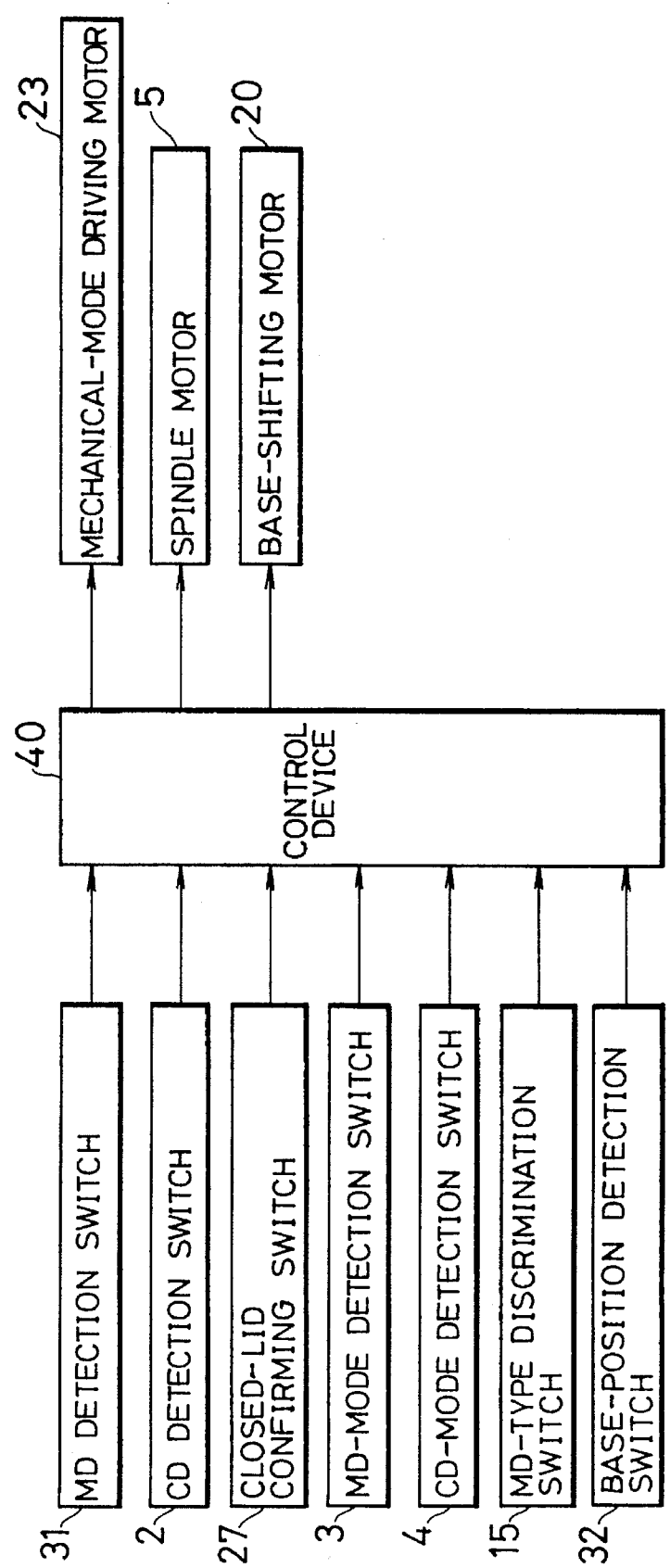
FIG. 9 is a block diagram showing a control system of the optical disk apparatus.

Next, an explanation will be given on the control device in the driving mechanism. As illustrated in FIG. 9, a control device 40 is a control means consisting of a microcomputer, etc. The control device 40 receives various signals, such as those released from the MD detection switch 31, the CD detection switch 2, the closed-lid confirming switch 27, the MD-mode detection switch 3, the CD-mode detection switch 4, the MD-type discrimination switch 15, and a base-position detection switch 32 for detecting the position of the pickup-use base 9, and controls the rotation directions and the rotation speeds of the mechanical-mode driving motor 23, the spindle motor 5, and the base-shifting motor 20 based on those signals.

Next, an explanation will be given on various operations in accordance with the arrangement of the present embodiment. Firstly, the inserting and removing operations of the MD 50 will be discussed by reference to FIG. 3. The lid 28 is urged clockwise around the fulcrum 28*a* of the cabinet 26, and the open state is thus maintained even when the MD 50 is inserted into the MD holder 30.

The lid 29 is held by a predetermined urging force so that it is maintained in a state that has been attained after the lid 29 has rotated clockwise around the fulcrums 28b and 29a. That is, the lids 28 and 29 are maintained in the open state with respect to the cabinet 26.

Figure 10:
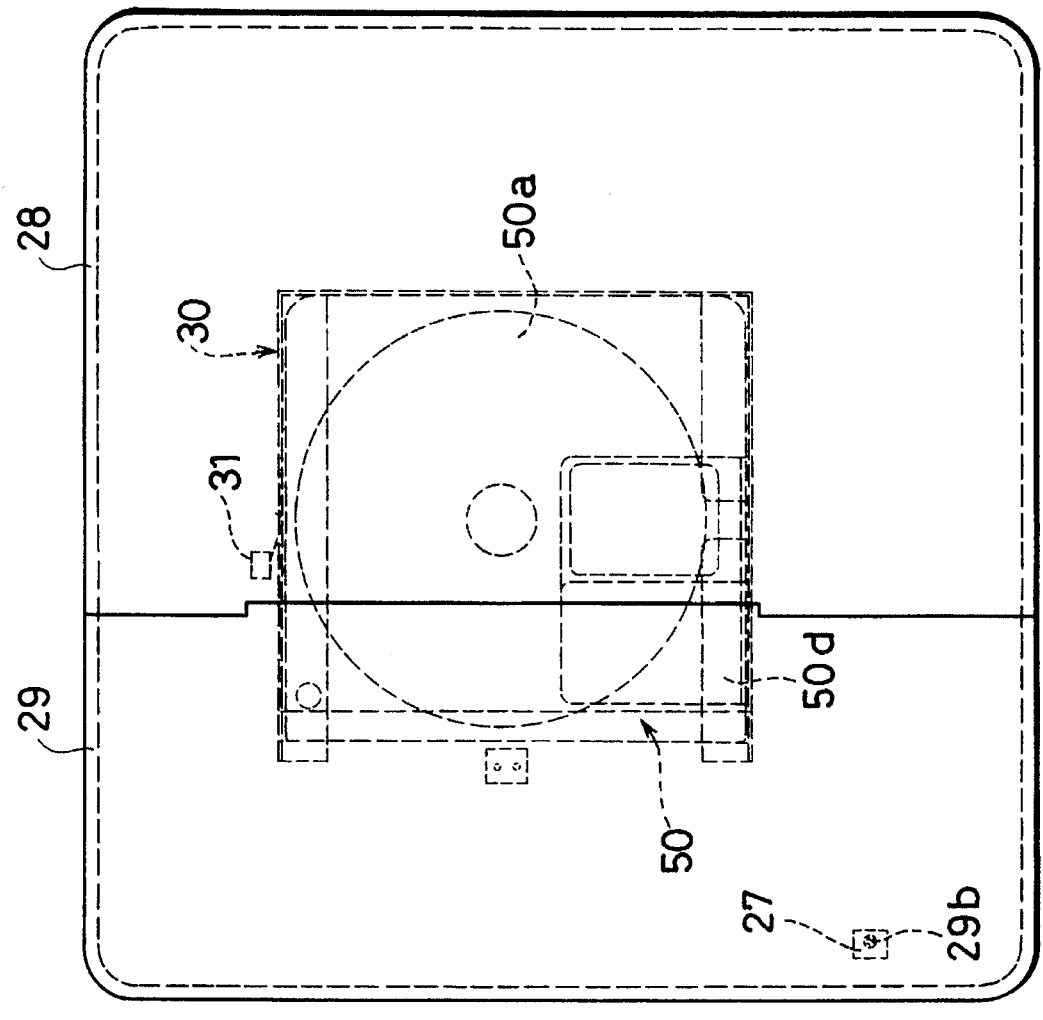
FIG. 10 is a plan view showing a state where an MD is inserted into the back side of the lid.

Meanwhile, the driving mechanism is set to the CD mode by the control device 40 because the closed-lid confirming switch 27 remains off. As illustrated in FIG. 10, the shutter 50d is attached to the MD 50. Therefore, when the MD 50 is inserted into the MD holder 30 in this state, the shutter 50d is shifted, thereby turning on the MD detection switch 31. Consequently, the optical disk 50a is exposed so as to be subjected to recording and reproduction made by the optical pickup 8.

In this case, as illustrated in FIG. 3, the lid 29 has been further rotated clockwise with respect to the lid 28; this makes it easier to insert the MD 50, which is smaller than the CD 60, into the MD holder 30.

In this open state, when the user presses the lid 29 downward, the lid 29 comes into contact with the contacting section 30e of the MD holder 30, and upon further pressing the lid 29, the lids 28 and 29 are integrally rotated counterclockwise with their upper faces maintained in the same plane.

Thereafter, as illustrated in FIG. 11, the lids 28 and 29 are locked by the locking means, and brought to the closed state with respect to the cabinet 26, thereby allowing the switch pressing 29b to turn on the closed-lid confirming switch 27.

The optical disk 50a is placed onto the MD mount section 6b of the turn table 6. In this case, the optical disk 50a is clamped onto the MD mount section 6b with the suction panel 50b of the MD 50 pulled down by the magnet 6c. Thus, the optical disk 50a is allowed to be driven by the turn table 6.

At this time, the base plate 14 has not been raised to the MD-mode station, and the MD-type discrimination switch 15, the main positioning pin 14d and the sub positioning pin 14e remain at their respective CD-mode positions. However, since the MD 50 is held by the elasticity of the MD holder 30, the MD 50 would not suffer from scratches due to vibration or other adverse effects.

Next, an explanation will be given on an operation for changing modes to the MD mode after the MD 50 has been inserted. As illustrated in FIGS. 1 and 2, the mechanical-mode driving motor 23 is first turned on, and the driving force is successively transmitted to the rack section 17i of the sliding plate 17 through the worm gear 22 and shifting gear 21, thereby shifting the sliding plate 17 in the A-direction.

Figure 12:
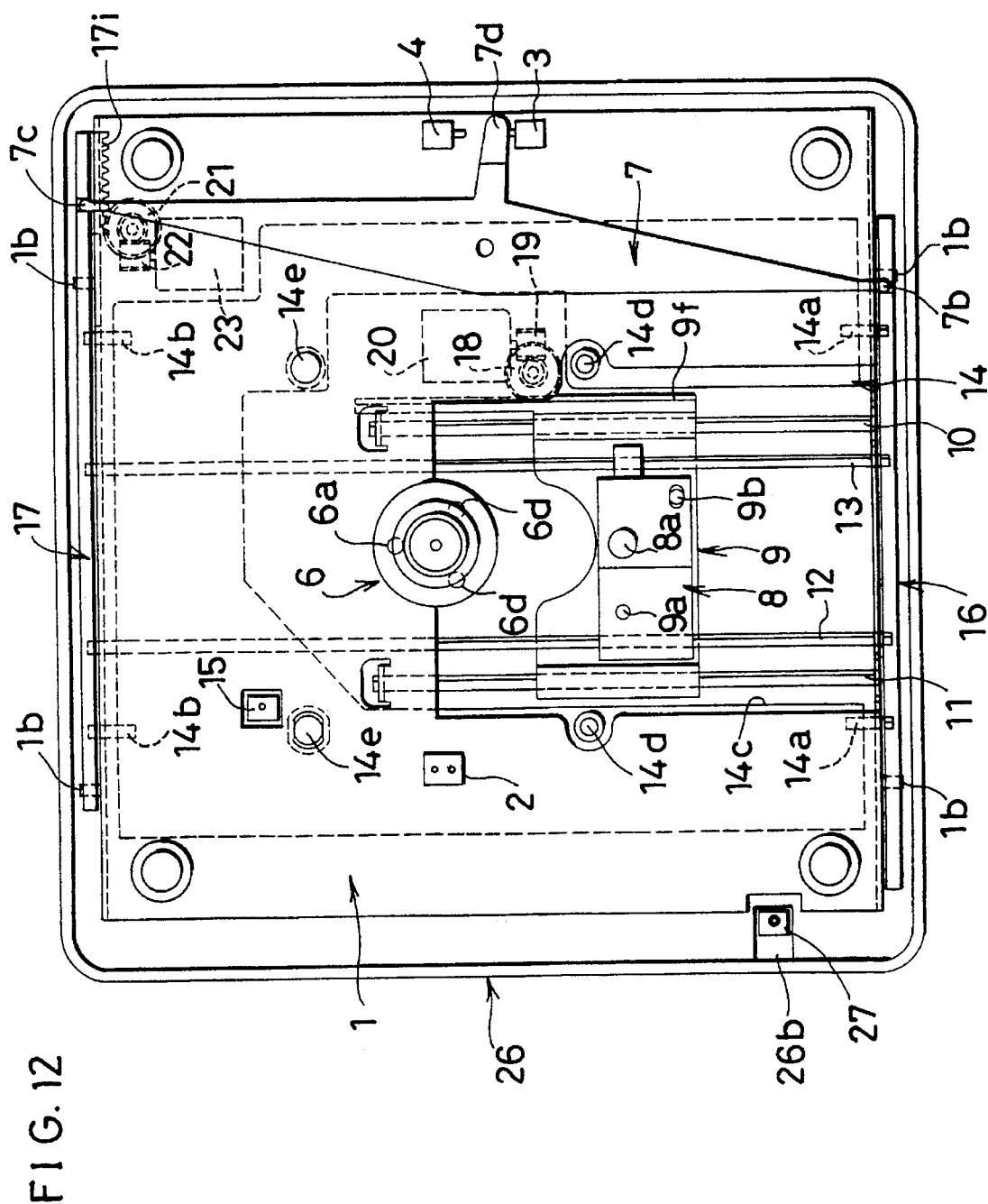
FIG. 12 is a plan view showing the optical disk apparatus in the MD mode.

The sliding plate 16, on the other hand, is shifted in the B-direction because it is coupled to the sliding plate 17 by the coupling arm 7. As the sliding plate 17 is shifted, the coupling arm 7 rotates, thereby turning off the CD-mode detection switch 4. As the coupling arm 7 further rotates, the MD-mode detection switch 3 is turned on as shown in FIG. 12.

Figure 13:
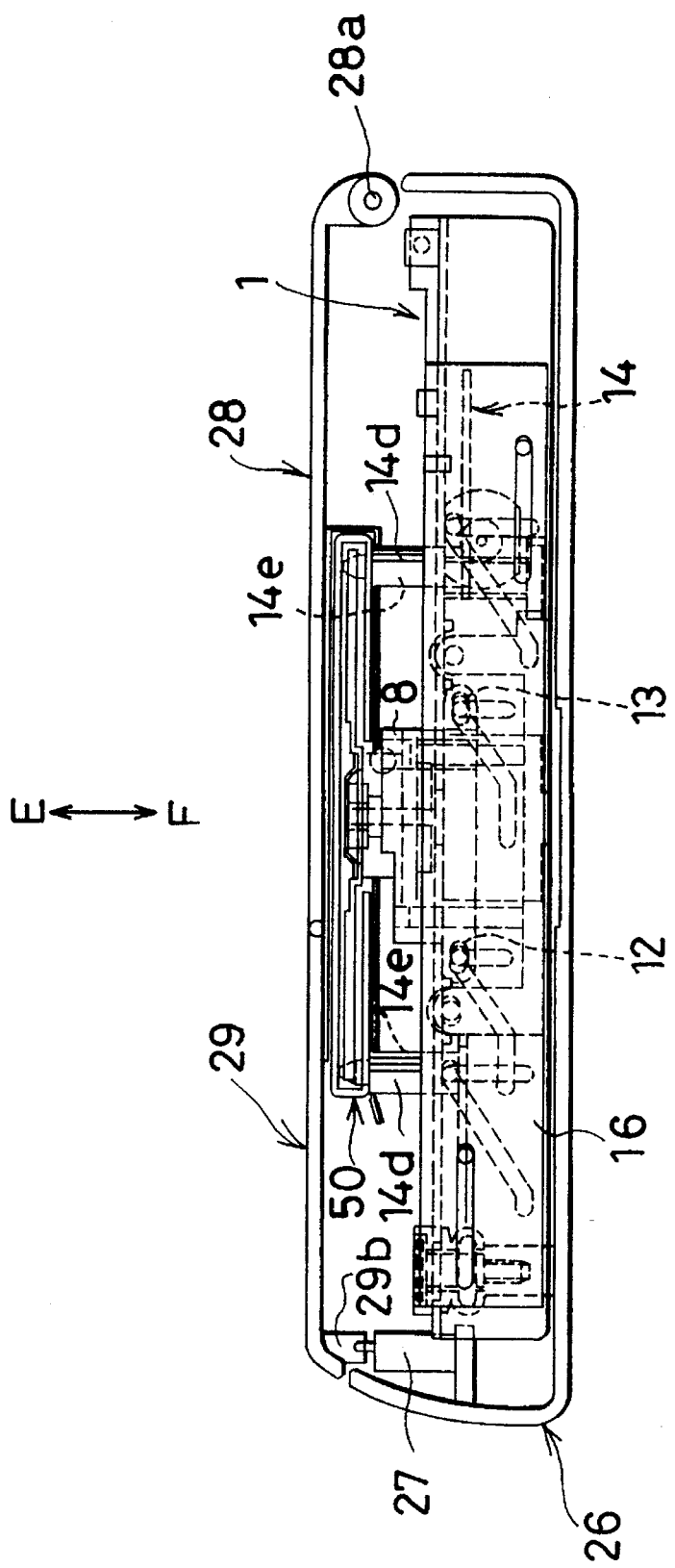
FIG. 13 is a side view of the essential part showing a state where the base plate is raised when the MD is placed into the optical disk apparatus.

As illustrated in FIG. 13, such cooperative movements of the sliding plates 16 and 17 cause the base plate 14 and the guide shafts 12 and 13 to rise upward (in the E-direction of FIG. 13) in parallel with the sub-chassis 1, and the sub positioning pins 14e of the base plate 14 come into contact with the MD 50. Further, the tops of the main positioning pins 14d are inserted into the pits (not shown) of the MD 50, thereby accurately positioning the MD 50.

The optical pickup 8, on the other hand, is raised to the MD-mode station by the guide shafts 12 and 13. Further, the MD-type discrimination switch 15, shown in FIG. 12, discriminates the type of the MD 50 placed thereon. Thus, the mode-changing operation of the base plate 14 and the optical pickup 8 to the MD-mode station is completed through the above-mentioned movements of the sliding plates 16 and 17.

After detecting the on-state of the closed-lid confirming switch 27 following the detection of the on-state of the MD detection switch 31, the control device 40 drives the mechanical-mode driving motor 23 so that the CD-mode detection switch 4 is turned off. After having driven the mechanical-mode driving motor 23 until the MD-mode detection switch 3 turns on, the control device 40 stops the motor 23. Such controlling operations of the control device 40 bring the driving mechanism to the MD mode.

Moreover, the control device 40 switches electric circuits, not shown, for use in recording and reproduction and controls the spindle motor 5 and the base-shifting motor 20 in accordance with a discrimination signal released from the MD-type discrimination switch 15. Thus, information is recorded and reproduced on and from the MD 50.

Next, an explanation will be given on operations that are carried out when the MD 50, which has been inserted in the manner as described above, is taken out. As illustrated in FIG. 13, when the lock means is released in a state where the lids 28 and 29 have been closed with respect to the cabinet 26, the lids 28 and 29 are rotated clockwise around the fulcrum 28a by the urging means, and brought to the open state, as shown in FIG. 3.

In this case, since the switch pressing section 29b located at the pivotal end of the lid 29 is separated from the closed-lid confirming switch 27, the closed-lid confirming switch 27 turns off, thereby releasing an off-signal to the control device 40. In response to the off-signal, the control device 40 provides control so that the spindle motor 5 is stopped and the pickup-use base 9 is shifted to a predetermined stand-by station, as shown in FIG. 2.

In addition, the control device 40 drives the mechanical-mode driving motor 23 so that the driving mechanism is changed from the MD mode to the CD mode. At this time, the sliding plate 17 is first shifted in the B-direction by the mechanical-mode driving motor 23, and the coupling arm 7 rotates counterclockwise, thereby turning off the MD-mode detection switch 3. When the coupling arm 7 further rotates counterclockwise to cause the CD-mode detection switch 4 to turn on, the mechanical-mode driving motor 23 is stopped, thereby making the driving mechanism enter the CD mode.

Figure 14:
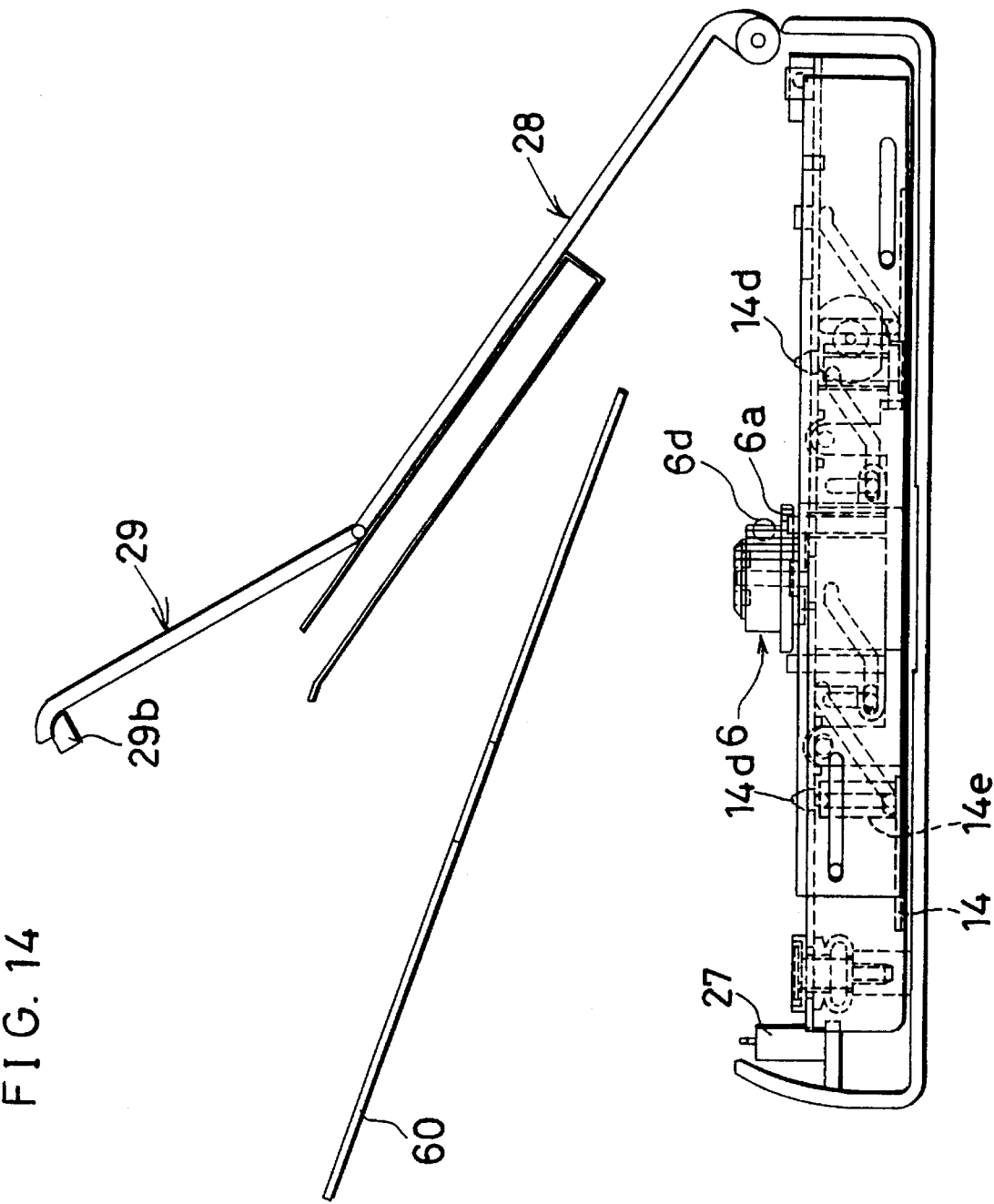
FIG. 14 is a side view of the essential part showing a state where a CD is being placed into the optical disk apparatus which is in the open-state.

In the CD mode, since the base plate 14 is lowered as illustrated in FIG. 14, the MD-type discrimination switch 15 and the positioning pins 14d and 14e, which stick out from the base plate 14, never interfere with the placing operation of the CD 60 onto the turn table 6.

Next, an explanation will be given on operations that are carried out when the CD 60 is inserted. As illustrated in FIGS. 2 and 14, in the open state of the lids 28 and 29, the user manually places the CD 60 onto the CD mount section 6a of the turn table 6 in spite of the urging force that is applied to the balls 6d. Here, also in the case of inserting the 8 cm-CD 61 for reproduction, the inserting operation is carried out in the same manner as the CD 60; therefore, in the following explanation, only the inserting operation of CD 60 for reproduction will be discussed, and the explanation on that of the 8 cm-CD 61 is omitted.

Figure 15:
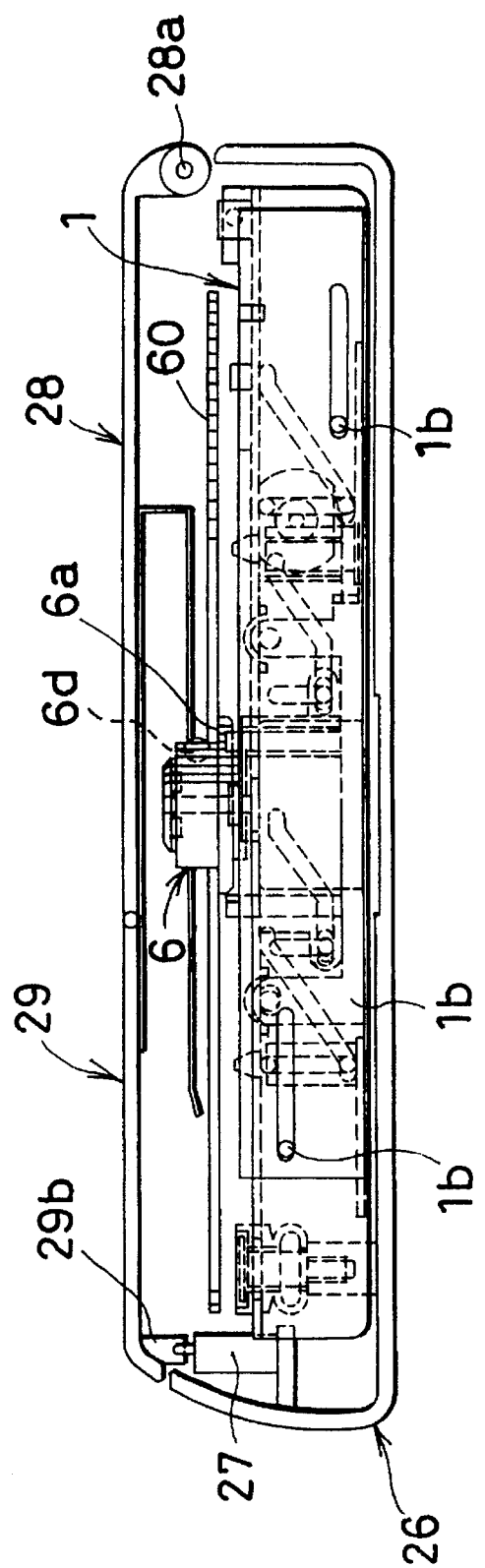
FIG. 15 is a side view of the essential part showing the optical disk apparatus in the closed-state after the CD has been placed therein.

After the inserting operation, the CD 60 is pressed against the CD mount section 6a by the urging force applied to the balls 6d, and clamped thereon. Next, when the user presses the lid 29 downward and closes it by rotating the lids 28 and 29 counterclockwise as shown in FIG. 15, the lid 29 is locked by the locking means. Thus, the switch pressing section 29b turns the closed-lid confirming switch 27 on, and the resulting on-signal is released to the control device 40.

When the CD 60 is placed onto the CD mount section 6a, the CD detection switch 2, shown in FIG. 2, is activated, and releases a signal for indicating the presence of the CD 60 to the control device 40. In response to the signals released from the closed-lid confirming switch 27 and the CD detection switch 2, the control device 40 controls the driving mechanism so that it drives the CD 60 in the CD mode. In this case, however, since the pickup-use base 9 and the base plate 14 have already been located at the CD-mode stations, it is not necessary to drive the mechanical-mode driving motor 23. Therefore, the control device 40 provides control so that the base-shifting motor 20 and the spindle motor 5 drive the CD 60 for reproduction.

Next, an explanation will be given on operations that are carried out when the CD 60 is taken out. As illustrated in FIGS. 2 and 14, when the lock means of the lid 29 is released, the pressing force of the switch pressing section 29b to the closed-lid confirming switch 27 is released, thereby allowing the closed-lid confirming switch 27 to turn off. Here, since the driving mechanism has already been entered the CD mode, the control device 40 does not drive the mechanical-mode driving motor 23, but stops the spindle motor 5. Further, the control device 40 drives the base-shifting motor 20 so that the pickup-use base 9 is moved to a position that is specified by the base-position detection switch 32 (see FIG. 9), that is, for example, the stand-by station of the optical pickup 8. Thus, the CD 60 placed on the CD mount section 6a is readily taken out.

As described above, when the lids 28 and 29 are in the open state, the driving mechanism always remains in the CD mode. That is, whenever the CD 60 is placed onto the CD mount section 6a of the turn table 6, the base plate 14 is kept at the lowered state. This arrangement makes it possible for the CD 60 to avoid contact against the MD-type discrimination switch 15, the main positioning pins 14d and the sub positioning pins 14e, which are located on the base plate 14, thereby protecting the recording surface of the CD 60 from being damaged.

Moreover, with the arrangement that the driving mechanism is always kept in the CD mode when at least the lid 29 is opened, the user does not need to confirm whether or not the CD mode of the driving mechanism is on upon inserting the CD 60; this results in simple operation.

Next, an explanation will be given on the case where both the MD 50 and the CD 60 are placed on the turn table 6. Firstly, as illustrated in FIGS. 2 and 3, the MD 50 is inserted into the MD holder 30, and at the same time, the CD 60 is placed onto the CD mount section 6a of the turn table 6. In this case, the MD detection switch 31 is turned on, and the resulting on-signal is released to the control device 40. The CD detection switch 2, on the other hand, releases a signal indicating the insertion of the CD 60 to the control device 40.

Here, two ways of setting are available with respect to the operation of the control device 40: For the first setting, if both the MD detection switch 31 and the CD detection switch 2 are turned on, the control device 40 does not start the next operation. As a result, the driving mechanism is maintained in the CD mode, and kept stopped. In other words, the spindle motor 5 and the base-shifting motor 20 are maintained in the stopped state, (which will be described in detail with reference to a flow chart shown in FIG. 16).

For the second setting, if both the MD detection switch 31 and the CD detection switch 2 are turned on, the control device 40 controls the driving mechanism so that the CD 60 placed is subjected to reproduction, (which will be described in detail with reference to a flow chart shown in FIG. 17). In other words, the spindle motor 5 and the base-shifting motor 20 are driven, thereby allowing information to be reproduced from the CD 60 by electric circuits, not shown.

In this case, the main positioning pins 14d and the sub positioning pins 14e, which are used for holding the MD 50, have been lowered, and kept separated from the MD 50. Nevertheless, the MD 50, which is placed on the MD mount section 6b, is almost set at the driving position by the MD holder 30. Therefore, even if the optical disk 50a contained inside the MD 50 is rotated by the turn table 6, it is possible to avoid troubles such as unwanted rubbing that occurs between the recording surface of the optical disk 50a and the inner face of the cartridge case; therefore, no troubles are caused. With this arrangement, since the spindle motor 5 rotates both the CD 60 and the optical disk 50a upon reproducing information from the CD 60, a slightly larger torque is required in comparison with the case where only the CD 60 is rotated. However, since such an increase of the torque is only small, it is not necessary to provide a spindle motor of a bigger size that produces a larger torque for this purpose.

For this reason, the above-mentioned spindle motor 5 can afford to rotate both the CD 60 and the optical disk 50a in the same manner as to drive only the CD 60. Therefore, the operations of the control device 40 are set so that information is reproduced from the CD 60 by rotating both the optical disk 50a and the CD 60 in the same manner as the case wherein reproduction of the CD 60 is made by rotating only the CD 60.

As described above, in the arrangement of the present embodiment, the turn table 6 has the MD mount section 6b at its top, and also has the CD mount section 6a below it. This structure makes it possible to place the MD 50 and the CD 60 or the 8 cm-CD 61 at respectively different stations that are located on the same rotation axis of the turn table 6.

A pair of the height guide shafts 9a and 9b are installed on the pickup-use base 9 in a protruding manner in parallel with the rotation axis of the turn table 6. Guided by the height guide shafts 9a and 9b, the optical pickup 8 is allowed to move interchangeably between the MD-mode station and the CD-mode station while maintaining suitable positional relationships with the respective recording surfaces of the MD 50 and the CD 60 or the 8 cm-CD 61.

In a conventional arrangement, in order to drive both the CD and the MD, an adapter for use in CD drive is removably attached to a turn table that is designed for use in MD drive, and an adapter shifting means is also installed to provide the adapter with a home station so as not to interfere with the placing operation of the MD onto the turn table. For this reason, it is necessary to preserve space for accommodating the adapter upon driving the MD; this has made the optical disk apparatus become bulky.

However, with the arrangement of the present embodiment, the adapter and the adapter shifting means can be omitted, and the space for accommodating the adapter can also be omitted; this achieves compactness of the optical disk apparatus. Moreover, since it is not necessary to provide a foolproofing means for avoiding misoperation of the adapter shifting means, it is possible to make the operations simpler than those of conventional apparatuses.

Accordingly, the above arrangement makes it possible to drive both the CD 60 and the MD 50 as well as to stabilize the driving operation of the CD 60 and the MD 50. Further, the simplified structure makes it possible to reduce troubles associated with the driving mechanism as well as to achieve compactness.

Furthermore, in the conventional arrangement, when a CD is to be driven, it is necessary to take processes such as placing the adapter onto the turn table, placing the CD onto the adapter, and putting a disk weight thereon so as to sandwich the CD between the adapter and the disk weight. In this case, the adapter is clamped by an attracting force that is exerted by the magnet of the turn table, and the CD is also clamped onto the adapter by an attracting magnetic force that is exerted between the magnet of the disk weight and the adapter.

However, upon taking out the CD, if the attracting force of the magnet of the disk weight is too large, the CD tends to be raised together with the adapter when the disk weight is lifted up; this causes troubles in taking out the CD. If the attracting force of the magnet of the disk weight is reduced in order to solve this problem, the rotative driving for the CD becomes unstable because of a reduced clamping force of the disk weight. Further, upon inserting in and taking out the CD, it is necessary to place and remove both the adapter and the disk weight in succession; this also causes a problem in operability.

However, the arrangement of the present embodiment eliminates the necessity of the adapter and the disk weight as well as the necessity of handling those members; therefore, it is possible to provide better operability compared to that of the conventional apparatus. Moreover, since the CD is clamped by using an urging force that is imparted to the balls 6d, it is not necessary to reduce the clamping force compared to the conventional method, thereby making it possible to stabilize the rotative driving for the CD.

Additionally, in the above arrangement, the explanation has been given by reference to an example wherein the balls 6d are used for clamping the CD; yet, the disk weight may be used in the same manner as the conventional arrangement. Even in this case, it is possible to omit the adapter, which has been necessary in the conventional arrangement, and to make the optical disk apparatus compact. Moreover, the above arrangement may be applied to a tray system wherein a CD is placed on a tray so as to be driven.

Figure 16:
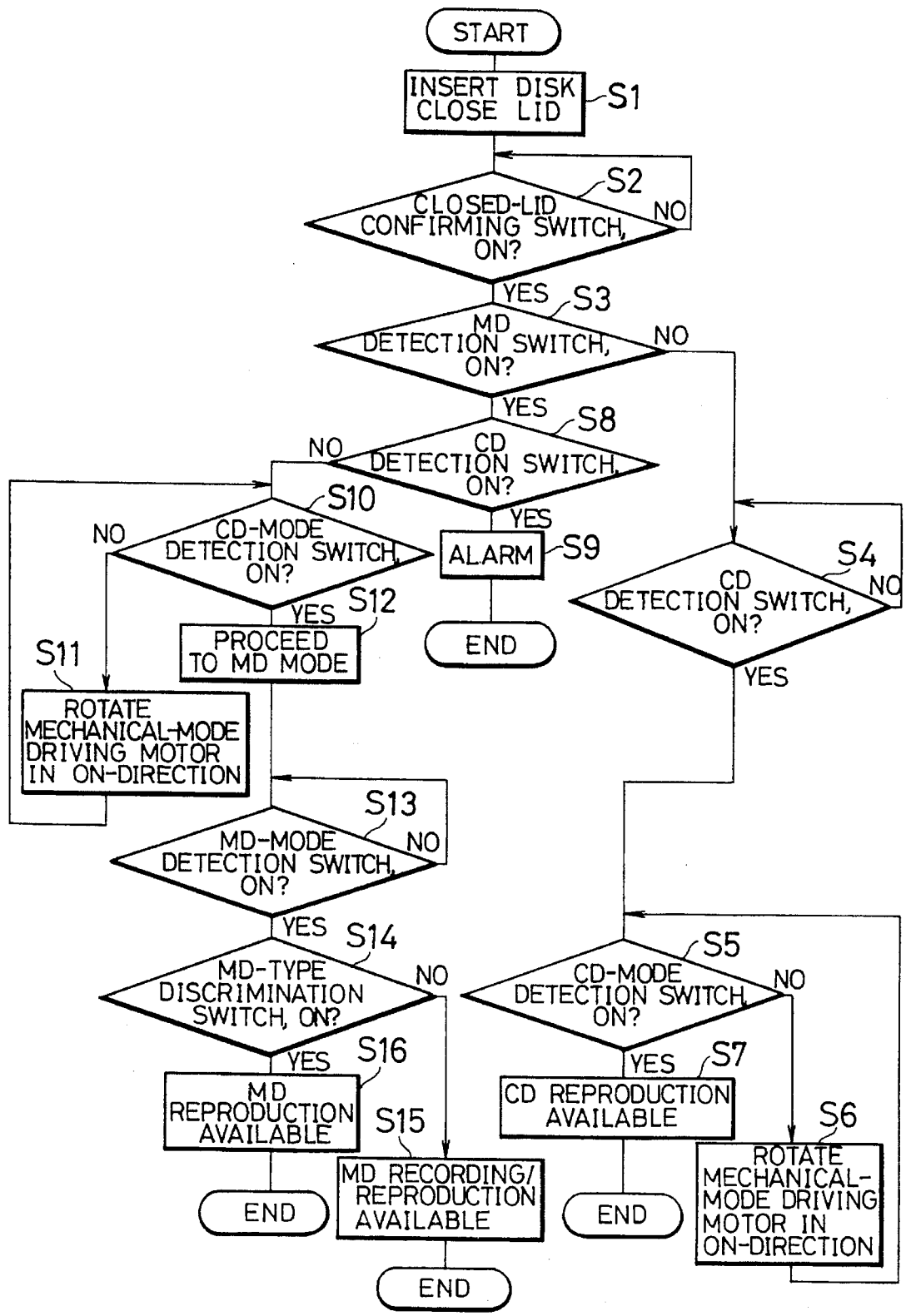
FIG. 16 is a flow chart showing a sequence of processes in the first starting mode of the optical disk apparatus.
Figure 17:
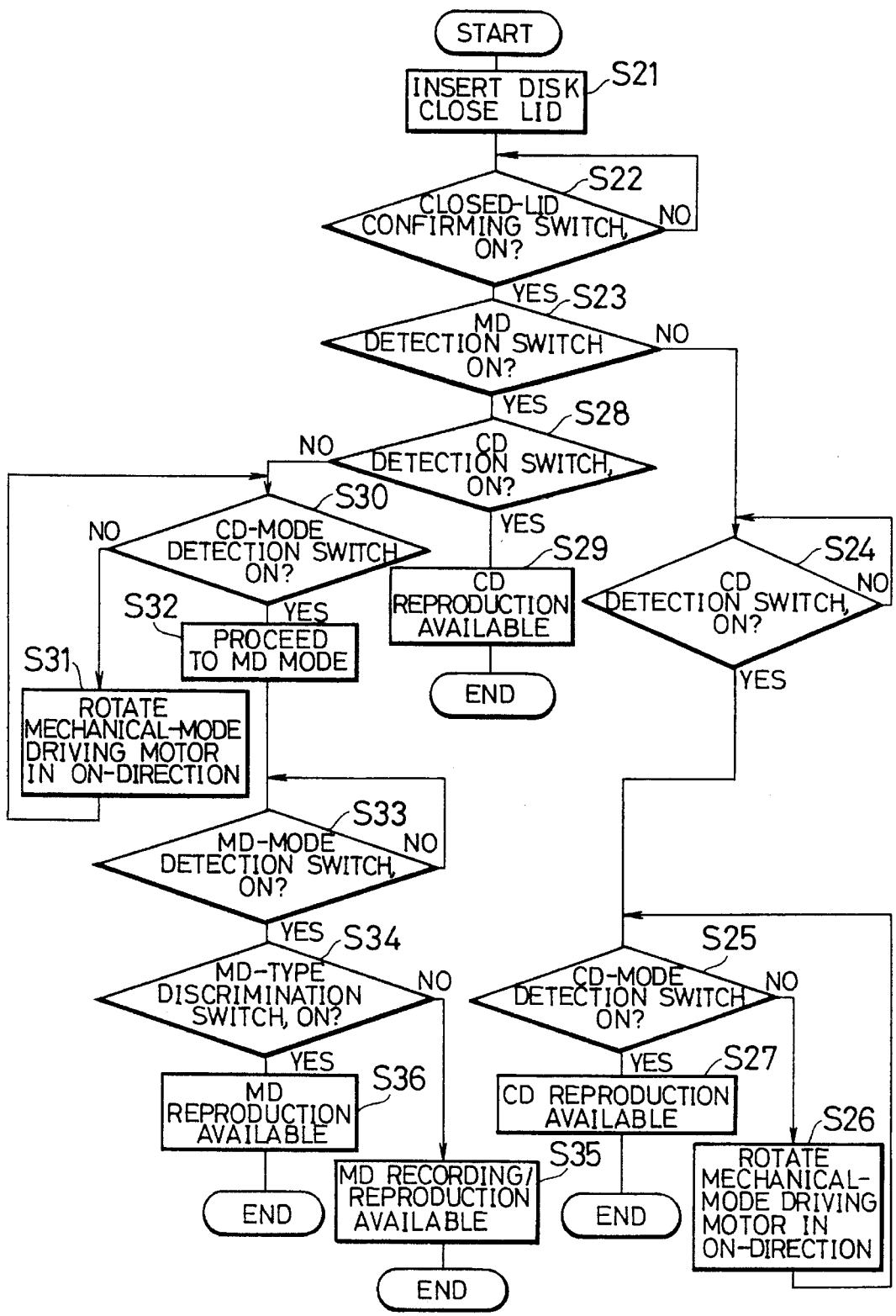
FIG. 17 is a flow chart showing a sequence of processes in the second starting mode of the optical disk apparatus.
Figure 18:
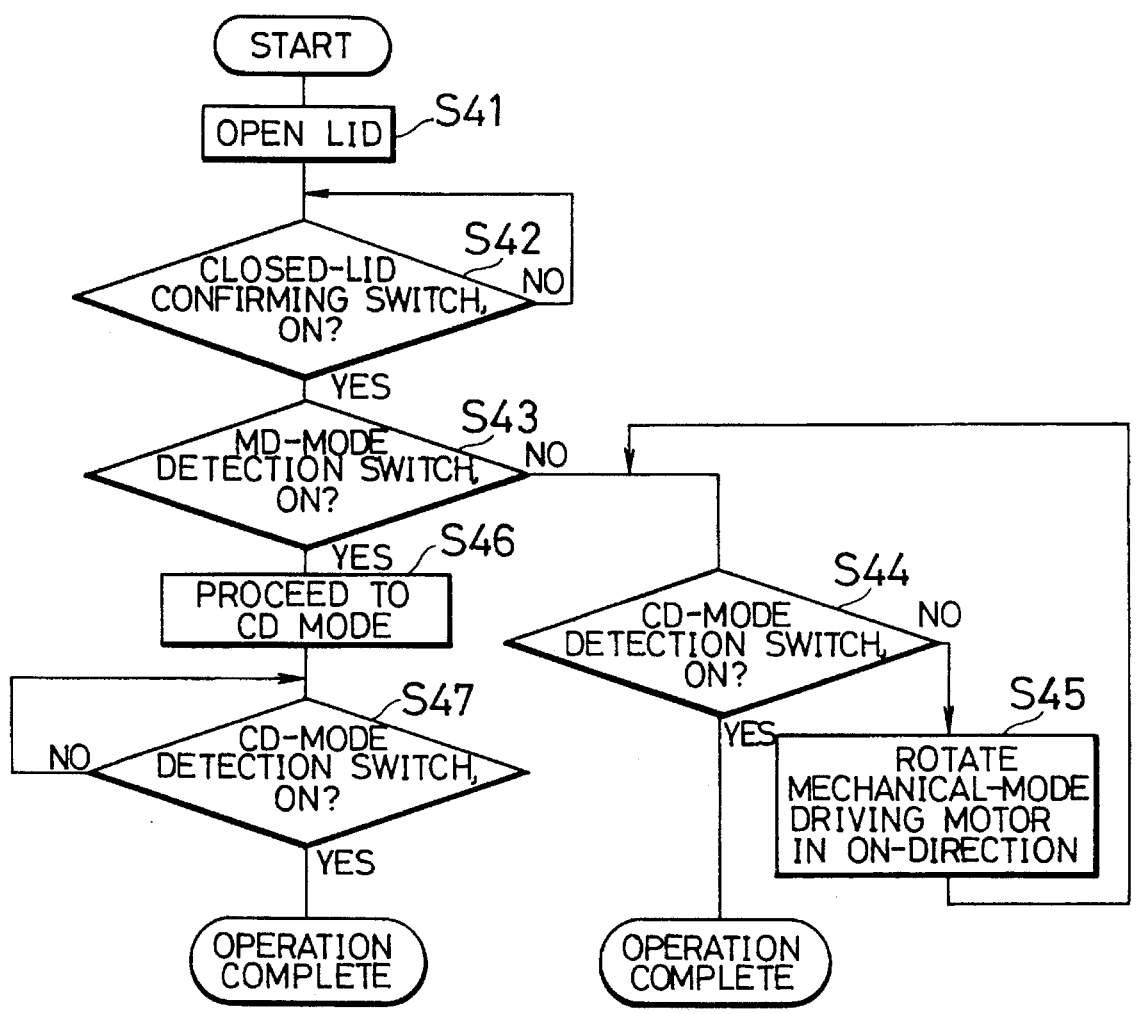
FIG. 18 is a flow chart showing a sequence of processes in the stopping mode of the optical disk apparatus.

Next, referring to FIGS. 1 and 2 as well as flow charts shown in FIGS. 16 through 18, the following description will discuss the operations of the driving mechanism.

Firstly, as to the first start mode of the driving mechanism, an explanation will be given with reference to the flow chart of FIG. 16. The first start mode includes the aforementioned first setting with respect to the operations of the control device 40. When both the MD 50 and the CD 60 are placed on the turn table 6 in the first start mode, the driving mechanism remains in the stopped state.

After inserting a disk, when the lids 28 and 29 are closed (Step 1, hereinafter, Step is referred to simply as S), a judgement is made as to whether the closed-lid confirming switch 27 is on or off (S2). Here, as to the insertion of disks, three cases are presented: Either an MD 50, a CD 60, or an 8 cm-CD 61 is inserted; both an MD 50 and a CD 60 are inserted; and both an MD 50 and an 8 cm-CD 61 are inserted.

When the closed-lid confirming switch 27 is off, the sequence returns to S2, and the driving mechanism enters the stand-by state. In contrast, when the closed-lid confirming switch 27 is on, a judgement is made as to whether the MD detection switch 31 is on or off (S3). If the MD detection switch 31 is off, a judgement is made as to whether the CD detection switch 2 is on or off (S4). At this time, if the CD detection switch 2 is off, the sequence returns to S4, and the driving mechanism enters the stand-by state.

In contrast, if the CD detection switch 2 is on at S4, a judgement is made as to whether or not the CD-mode detection switch 4 is on (S5), and if the CD-mode detection switch 4 is on, the sequence proceeds to a CD reproduction mode (S7).

Further, if the CD-mode detection switch 4 is off at S5, the mechanical-mode driving motor 23 is driven so as to turn on the CD-mode detection switch 4 (S6), and the sequence returns to S5.

When the CD-mode detection switch 4 has been turned on at S5 by driving the mechanical-mode driving motor 23, the mechanical-mode driving motor 23 is stopped, and the sequence proceeds to the CD reproduction mode (S7).

With this arrangement, even if the CD-mode detection switch 4 is turned off in the event of an offset of the driving mechanism from the CD mode due to vibration, falling down, or other troubles, the mechanical-mode driving motor 23 is driven so as to turn on the CD-mode detection switch 4. Consequently, since the main positioning pins 14d, the MD-type discrimination switch 15, and other members are withdrawn downward, it is possible to save the CD 60 from damages that might be caused by those members upon inserting it.

Meanwhile, if the MD detection switch 31 is on at S3, a judgement is then made as to whether the CD detection switch 2 is on or off (S8). If the CD detection switch 2 is on, an alarm mechanism is activated so as to give a warning indicating an undesired condition wherein both an MD 50 and a CD 60 are loaded (S9), thereby completing the sequence.

Moreover, if the CD detection switch 2 is off at S8, a judgement is made as to whether the CD-mode detection switch 4 is on or off (S10). If the CD-mode detection switch 4 is off, the mechanical-mode driving motor 23 is driven until the CD-mode detection switch 4 has been turned on (S11).

Successively, if the CD-mode detection switch 4 is on, the mechanical-mode driving motor 23 is driven so as to raise the base plate 14 and the optical pickup 8, thereby making the driving mechanism enter the MD mode (S12).

Thereafter, the mechanical-mode driving motor 23 is kept driven until the MD-mode detection switch 3 has been turned on. When the MD-mode detection switch 3 has been turned on, the mechanical-mode driving motor 23 is stopped (S13). In this case, the MD 50, which is placed therein, is held at an accurate station by the positioning pins 14d and other members on the base plate 14, and kept in contact with the MD-type discrimination switch 15. Therefore, the MD-type discrimination switch 15 is allowed to detect whether the MD 50 is dedicated solely to reproduction use or it is compatibly used in recording and reproduction.

Next, a detection is made as to whether the MD-type discrimination switch 15 is on or off (S14). If the MD-type discrimination switch 15 is off, it is determined that the MD 50 in question is a magneto-optical disk for use in recording and reproduction, and the sequence proceeds to a recording-reproduction mode (S15), thereby completing the sequence. In contrast, if the MD-type discrimination switch 15 is on, it is determined that the MD 50 in question is an optical disk that is dedicated solely to reproduction use, and the sequence proceeds to a reproduction-only mode (S16), thereby completing the sequence.

Here, referring to the flow chart of FIG. 17, an explanation will be given on the second start mode with respect to the driving mechanism. The second start mode includes the aforementioned second setting with respect to the operations of the control device 40. When both the MD 50 and the CD 60 are placed on the turn table 6 in the second start mode, the driving mechanism is controlled so that information is reproduced from the CD 60. Here, the second start mode is different from the first start mode only in the operation of the control device 40 which takes place when both the MD detection switch 31 and the CD detection switch 2 are on.

Therefore, the explanation is given only on the different processes. In the second start mode, even if both an MD 50 and a CD 60 are inserted, the driving mechanism and the electric circuits are controlled so that the CD 60 is subjected to reproduction (S29). As described earlier, since the MD 50 is held in the MD holder 30 accurately, it is possible to prevent the optical disk 50a contained inside the MD 50 from being damaged due to scraping-contact with the inner face of the cartridge of the MD 50 even if it is rotated together with the CD 60. In this case, however, since the positioning of the MD 50, which is made by the use of the main positioning pins 14d and other members, is not carried out, and since the MD-type discrimination switch 15 is not kept in contact with the MD 50, the driving mechanism is not allowed to shift to the MD mode.

However, the CD 60 is located below the MD 50, and allowed to rotate together with the MD 50; therefore, it is possible to reproduce information from the CD 60, and no problem is encountered in the reproduction.

As described above, in the present embodiment, when both the MD 50 and the CD 60 are placed on the turn table 6, the arrangement may be made so that a warning is given by means of alarm sound, or may be made so that information is reproduced from the CD 60.

Next, referring to FIG. 18, an explanation will be given on the stop mode of the above arrangement. During any one of the states where the reproduction of information is available from the MD 50, the recording and reproduction of information are available on and from the MD 50, and the reproduction of information is available from the CD 60, when the lids 28 and 29 are opened (S41), a judgement is made as to whether or not the closed-lid confirming switch 27 is off (S42). If the closed-lid confirming switch 27 is off, a judgement is made as to whether the MD-mode detection switch 3 is on or off (S43).

At this time, if the MD-mode detection switch 3 is off, a judgement is made as to whether the CD-mode detection switch 4 is on or off (S44). If the CD-mode detection switch 4 is off, the mechanical-mode driving motor 23 is driven (S45). When the sequence has proceeded to the CD mode, the CD-mode detection switch 4 turns on, thereby completing the operation of the stop mode.

In contrast, if the MD-mode detection switch 3 is on at S43, the mechanical-mode driving motor 23 is driven (S46). When the sequence has proceeded to the CD mode, the CD-mode detection switch 4 turns on (S47), thereby completing the operation of the stop mode.

In the above arrangement, whether the CD mode is on or the MD mode is on, the sequence is always made to proceed to the CD mode whenever the lids 28 and 29 are opened. Thus, when the lids 28 and 29 are opened during the MD mode, the MD mode is shifted to the CD mode, and the main positioning pins 14d and other members are readily moved downward. Therefore, even if the CD 60 is placed on the turn table 6 by mistake during the MD mode, it is possible to prevent the CD 60 from being damaged due to contact with the main positioning pins 14d or other members.

Next, referring to FIGS. 19 through 22, an explanation will be given on one modified example associated with the height-switching mechanism of the optical pickup 8 between the MD mode and the CD mode. Here, those members that have the same functions and that are described in the aforementioned embodiment are indicated by the same reference numerals and the description thereof is omitted.

Figure 19:
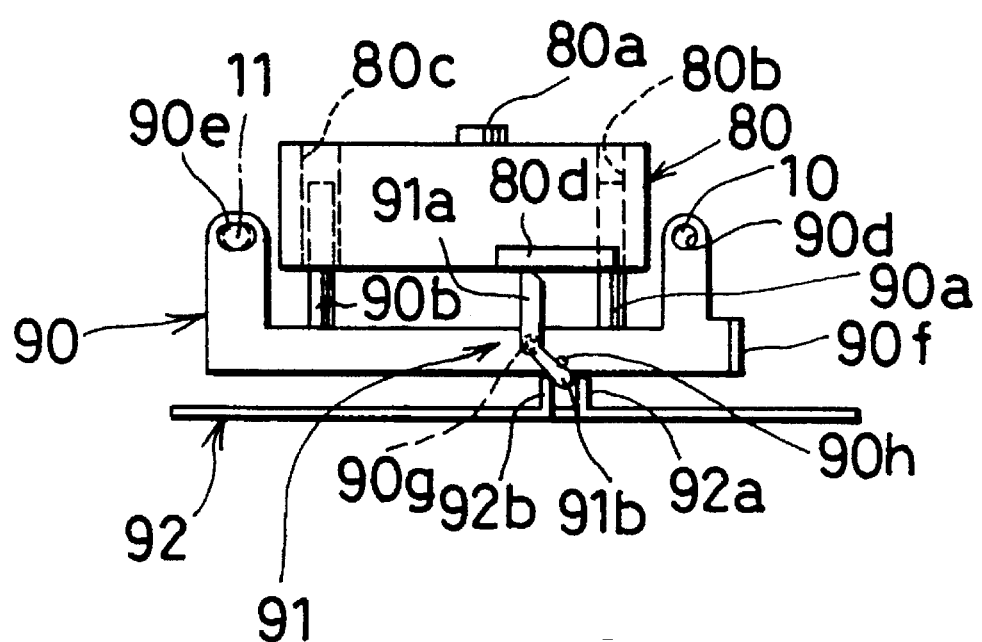
FIG. 19 is a front view of an essential part which shows one modified example of the height adjusting mechanism of the optical pickup in the optical disk apparatus as well as showing a state where the optical pickup is raised.
Figure 20:
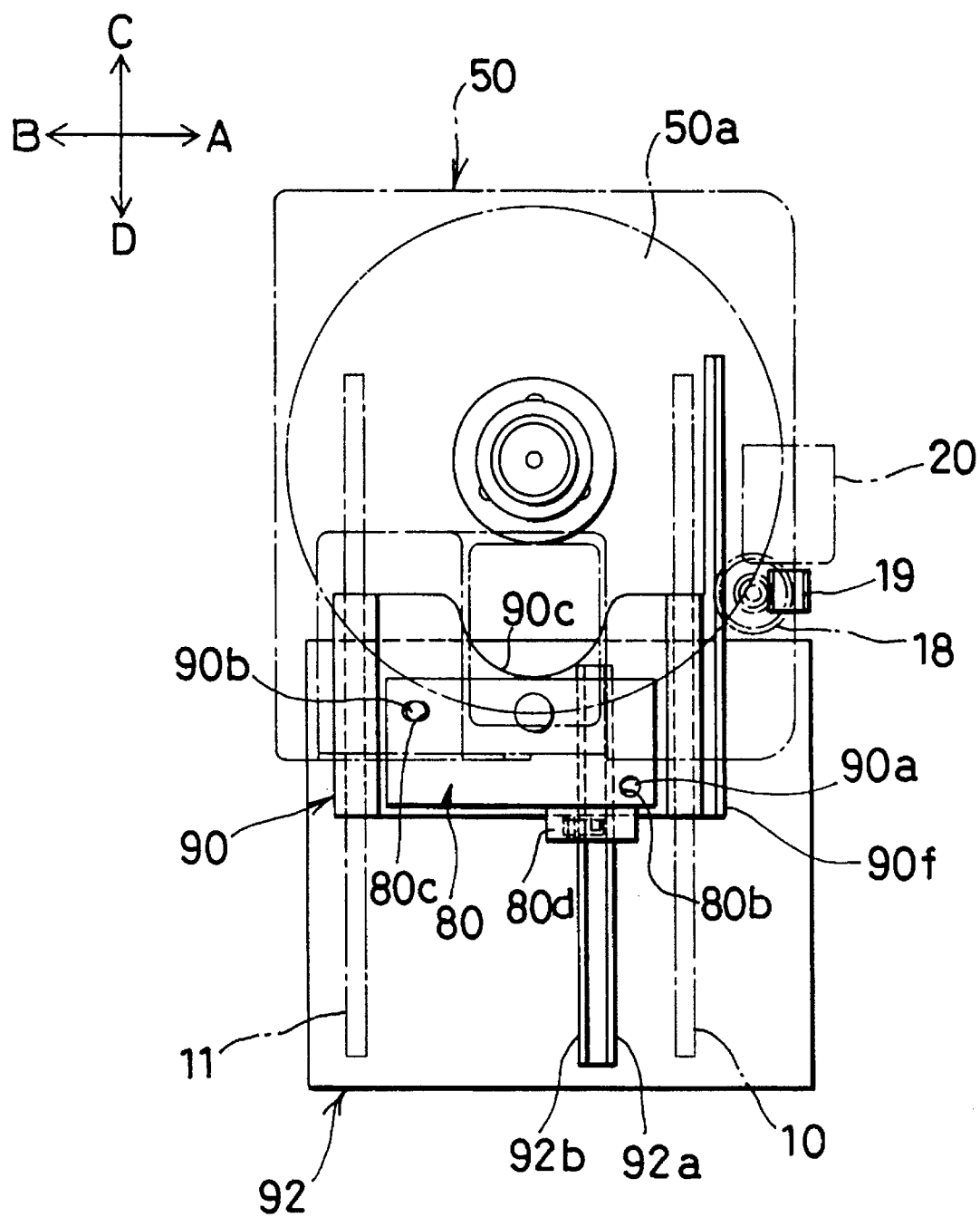
FIG. 20 is a plan view of an essential part showing the height adjusting mechanism of the optical pickup.

In the optical disk apparatus of the present embodiment, an optical pickup 80 shown in FIGS. 19 and 20 is employed instead of the optical pickup 8 of FIG. 1. The optical pickup 80 is provided with an objective lens 80a, a main height-guide hole 80b and a sub height-guide hole 80c. The functions of these members are the same as those of the objective lens 8a, the main height-guide hole 8b and the sub height-guide hole 8c in the aforementioned optical pickup 8.

To the bottom of the optical pickup 80, is fixed a contacting member 80d which sticks out in the D-direction (see FIG. 20), and is allowed to contact a cam section 91a that forms a pivotal end of a pivot arm 91, which will be described later. Further, there is also provided a pickup-use base 90 which supports the optical pickup 80 so that it can move in a vertical direction (in the direction of E–F shown in FIG. 19).

A pair of guide shafts 10 and 11, which are fixed to the sub-chassis (not shown) in the direction of C–D, are inserted through a main guide hole 90d and a sub guide hole 90e that are formed in the pickup base 90. Thus, the pickup base 90 is allowed to freely slide in the direction of C–D.

Further, a pair of height guide shafts 90a and 90b are fixed to the pickup-use base 90 in a protruding fashion so as to guide the optical pickup 80 to move in the vertical direction. Moreover, a rack section 90f, which is used for shifting the optical pickup 80 upon recording and reproduction, is also installed in the direction of C–D. The rack section 90f is driven by the shifting gear 18, the worm gear 19 and the base-shifting motor 20 in the same manner as the rack section 9f shown in FIG. 1.

A fulcrum axis 90g, which sticks out in the D-direction, is fixed to an end face of the pickup-use base 90 on the pivot arm 91 side below the contacting member 80d. The pivot arm 91 having a dog-leg shape is attached to the fulcrum axis 90g so as to pivot freely thereon. Further, a contacting pin 90h is fixed to the end face of the pickup-use base 90 on the pivot arm 91 side so as to restrict the pivotal range of the pivot arm 91.

The pivot arm 91 is attached to the fulcrum axis 90g in such a manner that both ends thereof are allowed to function as pivotal ends respectively. The cam section 91a is fixed to one end of the pivot arm 91, and a switching section 91b is fixed to the other end. The top of the cam section 91a is sharply pointed, and makes the contacting member 80d, that is, the optical pickup 80, move in an up and down direction through the pivotal movement of the pivot arm 91.

Here, the counterclockwise pivotal movement of the pivot arm 91 (in the H-direction shown in FIG. 19) is restricted by the contact of the side portion of the switching section 91b with the contacting pin 90h; therefore, the rise of the optical pickup 80 is stopped at a predetermined position.

Moreover, in the optical pickup 80 which has been raised by the counterclockwise pivotal movement of the pivot arm 91, the arrangement is made so that the top of the cam section 91a to come into contact with the contacting member 80d is located on the left side (on the direction B side in FIG. 19) of a perpendicular that passes through the fulcrum axis 90g.

With this arrangement, the pivot arm 91, which is forced to rotate counterclockwise due to the dead weight of the optical pickup 80, is stopped by the contacting pin 90h, thereby maintaining the optical pickup 80 at a predetermined height. Here, the optical pickup 80 is always urged downward (in the F-direction shown in FIG. 19) by an urging means (not shown).

Figure 21:
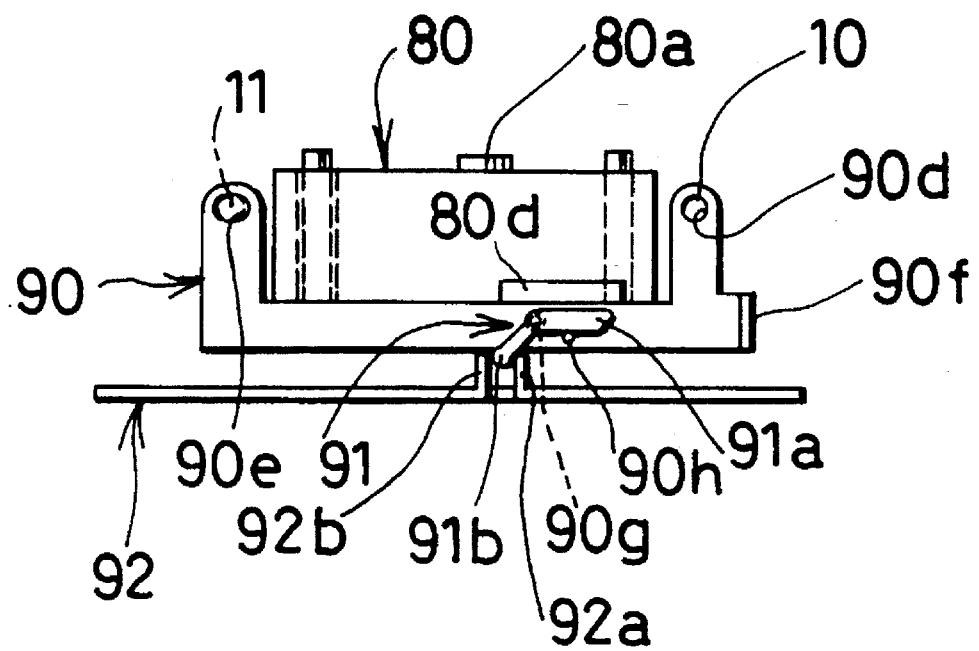
FIG. 21 is a front view of the essential part showing the height adjusting mechanism of the optical pickup, wherein the optical pickup is lowered.

In contrast, as the pivot arm 91, which has raised the optical pickup 80, rotates clockwise (in the G-direction shown in FIG. 19), the optical pickup 80 is lowered. When the side portion of the cam section 91a comes into contact with the contacting pin 90h, and is held by it, the contact between the cam section 91a and the contacting member 80d is released as shown in FIG. 21. Thus, the optical pickup 80 is moved to the lowest station with its lower face in contact with the upper face of the pickup-use base 90.

Moreover, in the sub-chassis below the pickup-use base 90, is installed a switching plate 92 that is capable of sliding freely in the direction of A–B. The switching plate 92 is arranged to be driven by a driving means, not shown, in the direction of A–B.

On the switching plate 92, are installed a pair of a CD-mode pressing member 92a and an MD-mode pressing member 92b, which have a plate shape or a rib shape and which extend in the direction of C–D, in parallel with each other in such a fashion as to sandwich the top of the switching section 91b. In this arrangement, as the switching plate 92 reciprocally moves in the direction of A–B as will be described later, either the CD-mode pressing member 92a or the MD-mode pressing member 92b comes into contact with the switching section 91b.

Next, an explanation will be given on the operation of the above-mentioned modified example. Firstly, in the CD mode, the contacting member 80d of the optical pickup 80 and the cam section 91a are separated from each other. This is because as to the pivot arm 91, the cam section 91a is designed to be heavier than the switching section 91b so as to impart an angular moment to the pivot arm 91.

Since the pivot arm 91 rotates due to its own angular moment until the cam section 91a comes into contact with the contacting pin 90h, the switching section 91b is separated from the CD-mode pressing member 92a as well as from the MD-mode pressing member 92b. Thus, the optical pickup 80 and the pickup-use base 90 are allowed to integrally move in the direction of C–D without receiving any resistance from the switching plate 92, as shown in FIG. 20.

In order to change modes from the CD mode to the MD mode, the switching plate 92 is moved in the A-direction by a driving means, not shown. Then, the MD-mode pressing member 92b comes into contact with the switching section 91b, and as the switching plate 92 is further moved, the MD-mode pressing member 92b makes the switching section 91b move in the same direction.

With this arrangement, the pivot arm 91 rotates counterclockwise, and the top of the cam section 91a comes into contact with the contacting member 80d of the optical pickup 80, thereby allowing the optical pickup 80 to move in the E-direction as shown in FIG. 19. This movement of the switching plate 92 is controlled so that it comes to stop when the contact portion between the cam section 91a and the contacting member 80d is moved counterclockwise, and exceeds the perpendicular that passes through the fulcrum axis 90g slightly.

Therefore, the pivot arm 91 further rotates counterclockwise due to the dead weight of the optical pickup 80, and stops when it comes into contact with the contacting pin 90h. This rotation of the pivot arm 91, which is made by the urging force and the dead weight of the optical pickup 80, allows the switching section 91b to separate from the CD-mode pressing member 92a as well as from the MD-mode pressing member 92b.

Figure 22:
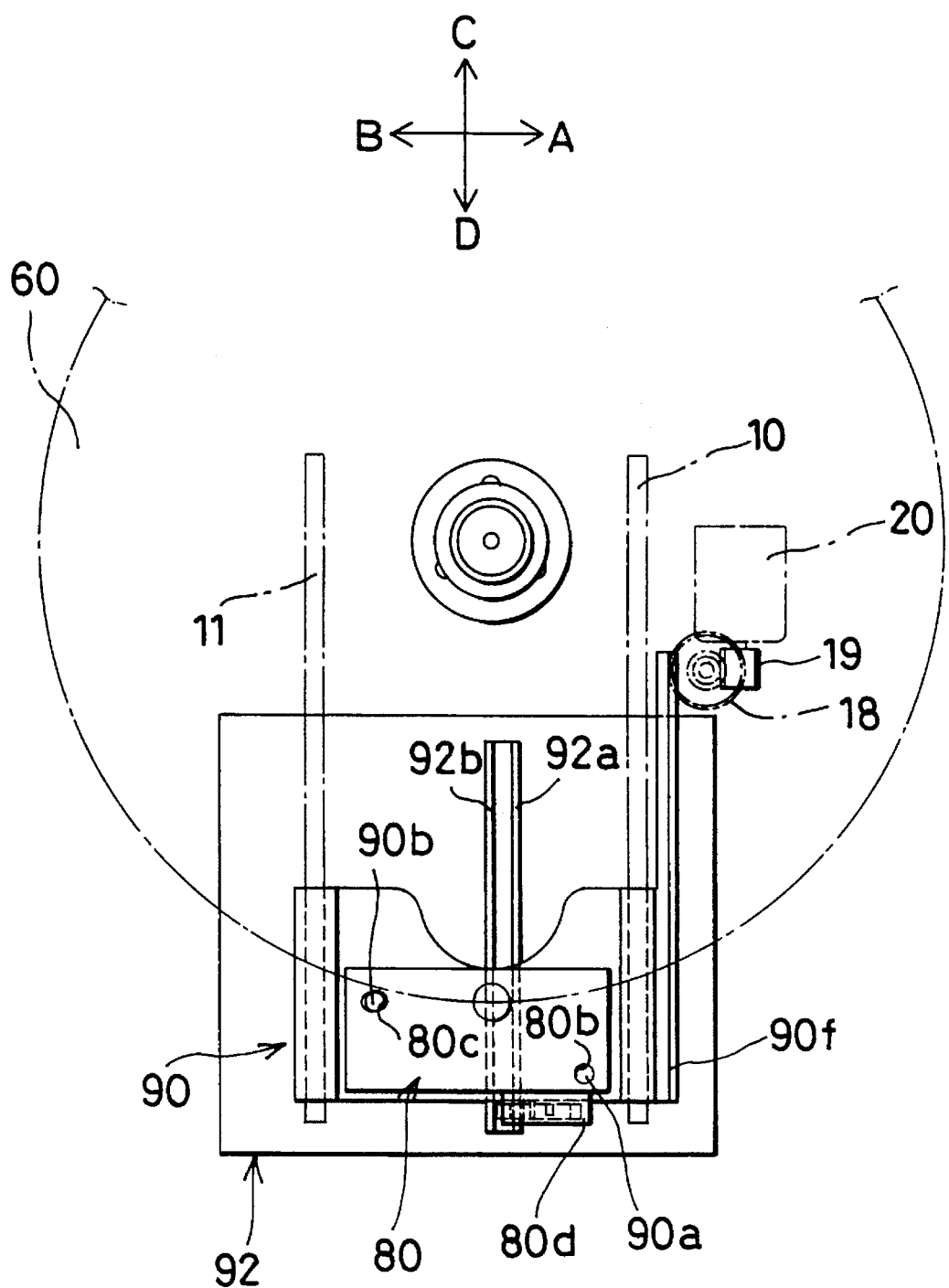
FIG. 22 is a plan view of an essential part showing the height adjusting mechanism of the optical pickup.
Figure 23:
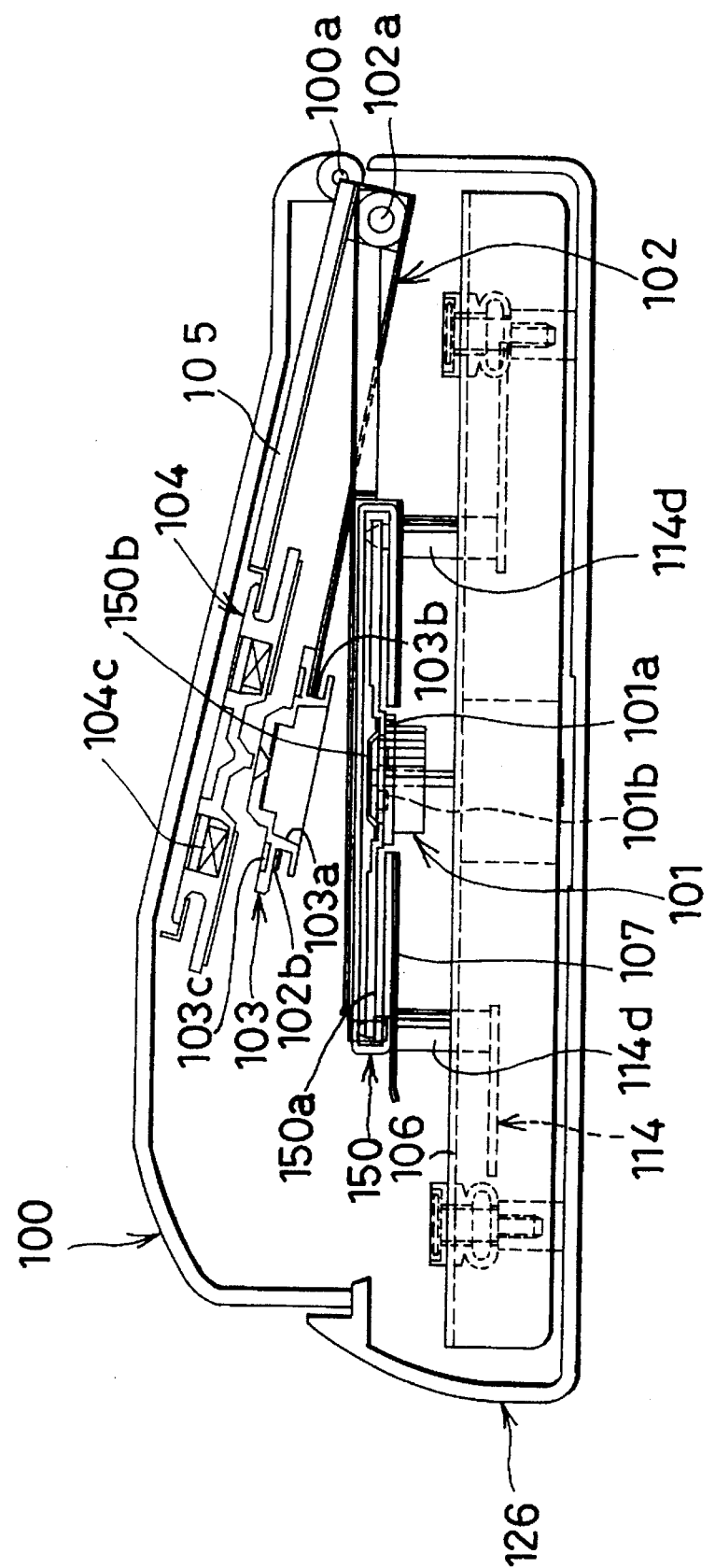
FIG. 23 is a side view of an essential part showing a contemporary optical disk apparatus wherein an MD is being driven.
Figure 24:
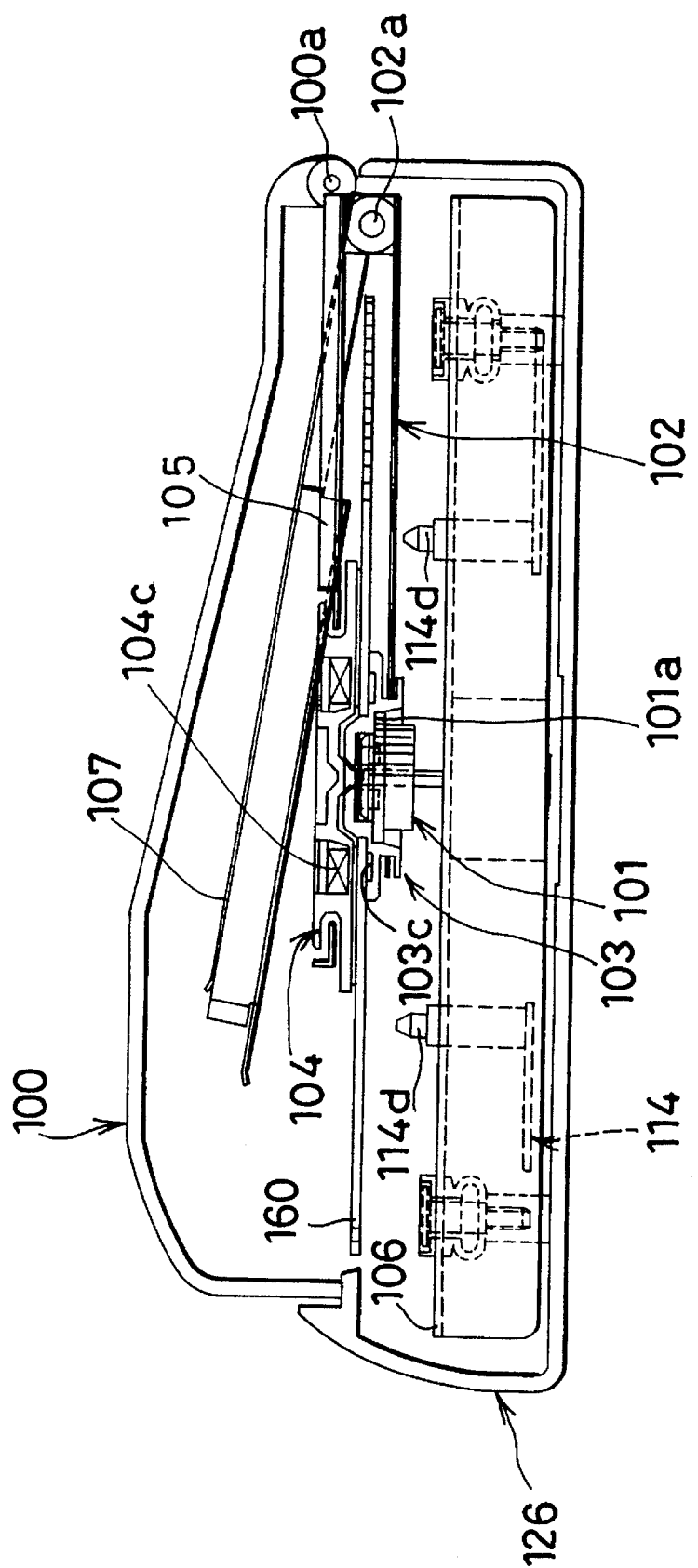
FIG. 24 is a side view of the essential part showing the contemporary optical disk apparatus wherein a CD is being driven.

Thus, since the optical pickup 80 and the pickup-use base 90 are kept separated from the switching plate 92, they are allowed to integrally move in the direction of C–D without receiving any resistance from the switching plate 92, as shown in FIG. 22.

Next, in order to change modes from the MD mode to the CD mode, the switching plate 92 is moved in the B-direction from the state shown in FIG. 19. Then, the CD-mode pressing member 92a moves the switching section 91b. When the contact portion between the cam section 91a and the contacting member 80d is moved clockwise and exceeds the perpendicular that passes through the fulcrum axis 90g slightly, the switching plate 92 is further moved in the B-direction by the urging force and the dead weight of the optical pickup 80, with the MD-mode pressing member 92b and the switching section 91b in contact with each other.

As the switching plate 92 is further moved, the optical pickup 80 comes into contact with the pickup-use base 90, and the optical pickup 80 stops on the pickup-use base 90, as shown in FIG. 21.

In this case, the switching plate 92 is controlled to stop. Thereafter, as described earlier, the pivot arm 91 further rotates due to the angular moment, and comes into contact with the contacting pin 90h, thereby being allowed to stop. Thus, the switching section 91b is separated from the CD-mode pressing section 92a as well as from the MD-mode pressing section 92b, and the pickup-use base 90 is allowed to move in the direction of C–D without receiving any resistance.

As described above, the arrangement of the present invention makes it possible for the optical pickup 80 to shift heights between the MD-mode height and the CD-mode height by the use of the movement of the switching plate 92. Further, after having reached the height of the mode in question, the contact between the pivot arm 91, installed on the pickup-use base 90, and the switching plate 92 is released. This arrangement prevents the switching plate 92 from interfering with the movements of the pickup-use base 90 that are performed upon placing the MD or the CD on the turn table 6. Therefore, this arrangement allows the optical pickup 80 to switch heights depending on the MD and the CD as well as to move smoothly in the radial direction upon recording and reproduction.

Additionally, if it is possible to record and reproduce information on and from both the MD and CD that are located at different heights without changing the height of the optical pickup 80 by use of the focusing control for the optical pickup 80, the height-switching mechanism of the optical pickup 80 as described above may be omitted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical disk apparatus comprising:

a rotatable driving member for driving a disc-shaped first recording medium while contacting the circumferential edge of a first center hole of the first recording medium held at a first station as well as for driving a disc-shaped second recording medium while contacting the circumferential edge of a second center hole of the second recording medium held at a second station, the first center hole being arranged to have a diameter smaller than that of the second center hole, wherein the first and second recording media are simultaneously held by the driving member at the respectively different first and second stations of a rotation axis of the driving member, wherein the driving member comprises:

a first ring-shaped table for supporting the circumferential edge of the first center hole;

a second ring-shaped table for supporting the circumferential edge of the second center hole, the centers of the first table and the second table being aligned on a straight line that coincides with the rotation axis, the driving member is provided with a fixing means at a top portion thereof which presses the first recording medium onto the first table, wherein the first recording medium is housed in a cartridge case; the fixing means includes a magnet; and the magnet presses the first recording medium onto the first table by attracting a suction plate that is installed inside the cartridge case;

shifting means for shifting a reading means in parallel with the rotation axis; and control means for controlling the shifting means so that when only the first recording medium is supported by the driving member, the reading means is shifted to a first reading position where the first recording medium is to be read, and so that except when only the first recording medium is supported by the driving member, the reading means is shifted to a second reading position where the second recording medium is to be read.

2. The optical disk apparatus as defined in claim 1, wherein the first table is formed closer to the top of the driving member in comparison with the second table.

3. The optical disk apparatus as defined in claim 2, wherein the driving member is provided with a cylinder face that is located between the first table and the second table and that is coaxial with the rotation axis, the cylinder face being provided with a fixing means for pressing the second recording means onto the second table.

4. The optical disk apparatus as defined in claim 3, wherein the fixing means includes a plurality of balls that freely stick out or withdraw from the cylinder face, the balls being urged outward, the second recording medium being supported in a sandwiched fashion between the balls and the second table.

5. The optical disk apparatus as defined in claim 1, wherein the diameter of the first center hole is virtually the same as an inner diameter of the first table, and the diameter of the second center hole, which is larger than the outer diameter of the first table, is virtually the same as an inner diameter of the second table.

6. The optical disk apparatus as defined in claim 1, wherein the first recording medium is housed in a cartridge case.

7. The optical disk apparatus as defined in claim 1, wherein the driving member is provided with a fixing means which presses the second recording medium onto the second table.

8. An optical disk apparatus comprising:

medium holding means for housing and holding a cartridge case including a first recording medium, the medium holding means being arranged to move between a first station at which the cartridge case including the first recording medium is removably inserted and a second station and being provided with a driving-use hole to fit with a first center hole of the cartridge case and first recording medium; and a driving member for rotatively driving the first recording medium with a top portion thereof being inserted through the driving-use hole of the medium holding means only when the medium holding means is located at the second station so as to stay in contact with the circumferential edge of the first center hole of the first recording medium, as well as for rotatively driving a second recording medium by contacting the circumferential edge of a second center hole of the second recording medium at a station which is different from the top portion of the rotation axis of the driving member, wherein the first and second recording media are simultaneously held by the driving member at the respectively different top portion and the station which is different from the top portion of the rotation axis of the driving member, the first center hole having a diameter smaller than that of the second center hole, wherein the driving member includes a magnetic fixing element which presses the first recording medium onto the driving member by attracting a suction plate which is included inside the cartridge case, wherein the second recording medium, which is to be rotatively driven, is supported by the driving member a predetermined distance apart from the medium holding means when located at the second station;

shifting means for shifting a reading means in parallel with the rotation axis; and control means for controlling the shifting means so that when only the first recording medium is supported by the driving member, the reading means is shifted to a first reading position where the first recording medium is to be read, and so that except when only the first recording medium is supported by the driving member, the reading means is shifted to a second reading position where the second recording medium is to be read.

9. The optical disk apparatus as defined in claim 8, wherein the driving member comprises:

a first ring-shaped table for supporting the circumferential edge of the first center hole; and a second ring-shaped table for supporting the circumferential edge of the second center hole, the centers of the first table and the second table being aligned on a straight line that coincides with the rotation axis.

10. The optical disk apparatus as defined in claim 8, wherein the first recording medium is housed in a cartridge case, and the medium holding means, made of flexible thin plates, is formed into a box shape having an insert-use opening.

11. The optical disk apparatus as defined in claim 10, further comprising:

a lower frame for housing the optical disk apparatus, the top of the lower frame being open; and lid means for covering the top of the lower frame, the lid means being attached to one end of the lower frame so as to freely pivot thereon, wherein the medium holding means, formed into a box shape having an insert-use opening, is attached to a back face of the lid means.

12. The optical disk apparatus as defined in claim 4, wherein the lid means pivots between the first station and the second station.

13. The optical disk apparatus as defined in claim 11, wherein the lid means includes a first lid that is pivotally attached to one end of the lower frame and a second lid that is pivotally attached to a pivotal end of the first lid.

14. The optical disk apparatus as defined in claim 13, wherein the first lid and the second lid are located on the same plane when the second lid is closed, the insert-use opening of the medium holding means being arranged to stick out toward the pivotal end of the second lid from a pivotal end of the first lid.

15. An optical disk apparatus comprising:

a driving member for driving a disc-shaped first recording medium with a top portion of the driving member contacting the circumferential edge of a first center hole of the first recording medium as well as for driving a disc-shaped second recording medium while contacting the circumferential edge of a second center hole of the second recording medium, the first center hole being arranged to have a diameter smaller than that of the second center hole, the driving member being provided with a rotation axis, the first and second recording media being simultaneously held by the driving member with the second recording medium being held by the driving member at a station which is different from the top portion of the rotation axis of the driving member during operation of the optical disk apparatus;

reading means for reading information by scanning either a recording surface of the first recording medium or that of the second recording medium;

shifting means for shifting the reading means in parallel with the rotation axis; and control means for controlling the shifting means so that when only the first recording medium is supported by the driving member, the reading means is shifted to a first reading position where the first recording medium is to be read, and so that except when only the first recording medium is supported by the driving member, the reading means is shifted to a second reading position where the second recording medium is to be read.

16. The optical disk apparatus as defined in claim 15, wherein the driving member comprises:

a first ring-shaped table for supporting the circumferential edge of the first center hole; and a second ring-shaped table for supporting the circumferential edge of the second center hole, the centers of the first table and the second table being aligned on a straight line that coincides with the rotation axis.

17. The optical disk apparatus as defined in claim 15, wherein when the first recording medium and the second recording medium are simultaneously supported by the driving member, positional relationships are predeterminately set among the top portion, the first recording medium, the second recording medium and the reading means in this order along the rotation axis.

18. The optical disk apparatus as defined in claim 17, wherein when the first recording medium and the second recording medium are simultaneously supported by the driving member, the reading means reads information from the second recording medium.

19. The optical disk apparatus as defined in claim 15, wherein when the first recording medium and the second recording medium are simultaneously supported by the driving member, the radii of the disc-shaped recording medium and the disc-shaped second recording medium are orthogonal to the rotation axis.

20. The optical disk apparatus as defined in claim 19, further comprising:

a first support member for supporting the reading means so as to allow the reading means to move in the radial direction;

said shifting means shifting the reading means in parallel with the rotation axis by moving the first support member in parallel with the rotation axis; and holding means for transmitting to the reading means a force to be applied to move the reading means in the radial direction, the holding means being geared to the reading means.

21. The optical disk apparatus as defined in claim 20, wherein the first recording medium and the second recording medium are optical recording media, the reading means being arranged to project a light beam onto either the recording surface of the first recording medium or that of the second recording medium and to read information by detecting a reflected light from the recording surface.

22. The optical disk apparatus as defined in claim 21, wherein the holding means comprises:

a guide member that is geared to the reading means so that the reading means is guided to freely move in parallel with the rotation axis.

23. The optical disk apparatus as defined in claim 20, further comprising:

a second support member for supporting the holding means so as to allow the holding means to move in the radial direction, the reading means and the holding means being allowed to integrally move in the radial direction.

24. The optical disk apparatus as defined in claim 23, further comprising a sub-chassis for supporting the driving member, wherein the first support member includes a first guide shaft that is geared to the shifting means and disposed in parallel with the radial direction, and the second support member includes a second guide shaft that is securely fixed to the sub-chassis and disposed in parallel with the first guide shaft.

25. The optical disk apparatus as defined in claim 20, wherein the first support member includes a guide shaft that is geared to the shifting means and disposed in parallel with the radial direction, the reading means being provided with a guide hole whereto the guide shaft is slidably inserted.

26. The optical disk apparatus as defined in claim 25, wherein the shifting means includes two sliding plates that are disposed symmetrically with respect to the rotation axis, each sliding plate being provided with a groove to which an end of the guide shaft is geared, the groove being formed into a shape such that as the sliding plates are shifted in directions opposite to each other in parallel with the radial direction, the guide shaft is moved upward and downward vertically in the radial direction.

27. The optical disk apparatus as defined in claim 25, further comprising:

pivot arm means for shifting the sliding plates in reverse directions to each other in parallel with the radial direction by pivoting while staying in mesh with the sliding plates;

first-mode detection switch for detecting the fact that the reading means has been moved to a first-mode station at which the first recording medium is scanned; and second-mode detection switch for detecting the fact that the reading means has been moved to a second-mode station at which the second recording medium is scanned, wherein the pivot arm means turns on the first-mode detection switch when the pivot arm means has moved the reading means to the first-mode station by pivoting in a first direction so as to shift the sliding plates, as well as turning on the second-mode detection switch when the pivot arm means has moved the reading means to the second-mode station by pivoting in a second direction opposite to the first direction so as to shift the sliding plates.

28. The optical disk apparatus, as defined in claim 27, further comprising:

first detection means for detecting the fact that the first recording medium is placed on the driving member; and said control means controlling the pivot arm means so that when the first detection means detects the fact that the first recording means is not placed on the driving member and when the second-mode detection switch remains off, the pivot arm means pivots in the second direction until the pivot arm means turns on the second-mode detection switch, thereby allowing the reading means to move to the second-mode station.

29. The optical disk apparatus, as defined in claim 28, further comprising:

a sub-chassis for supporting the driving member, the sub-chassis being provided with respective two side faces for supporting the sliding plates so as to allow the sliding plates to freely shift in parallel with the radial direction and an upper face for supporting the pivot arm means so as to allow the pivot arm means to freely pivot, the first-mode detection switch and the second-mode detection switch being fixed to the upper face.

30. The optical disk apparatus as defined in claim 29, wherein the pivot arm means is attached to a shaft on the upper face so as to pivot in the first direction or in the second direction between the first-mode detection switch and the second-mode detection switch, the first-mode detection switch and the second-mode detection switch being turned on upon contacting the pivot arm means.

31. The optical disk apparatus as defined in claim 20, wherein the shifting means includes a cam means for converting a first force that is exerted in parallel with the radial direction to a second force that is exerted in parallel with the rotation axis so as to transmit the second force to the reading means.

32. The optical disk apparatus as defined in claim 31, further comprising:

cam driving means for driving the cam means while staying in contact with the cam means, the cam means being separated from the cam driving means when the reading means is moved to a station at which information is read from either the first recording medium or the second recording medium.

33. The optical disk apparatus as defined in claim 32, wherein the holding means includes a height-guide member that is geared to the reading means so that the reading means is guided to freely move in parallel with the rotation axis and the cam means includes a pivot arm for pivoting so as to move the reading means in parallel with the rotation axis, the pivot arm being attached to the holding means so as to freely rotate thereon.

34. The optical disk apparatus as defined in claim 33, wherein the first support member includes a guide shaft that is geared to the shifting means and disposed in parallel with the radial direction, the reading means being provided with a guide hole whereto the guide shaft is slidably inserted, the pivot arm includes a driving end that comes into contact with the cam driving means, and the cam driving means includes a switching plate that reciprocally moves in parallel with the radial direction while contacting the driving end below the holding means.

35. The optical disk apparatus as defined in claim 34, wherein the switching plate includes two ribs that sandwich the driving end and that are formed thereon in an extended fashion in parallel with the guide shaft.

36. The optical disk apparatus as defined in claim 20, further comprising:

completion detecting means for detecting the fact that a driving operation of the first recording medium or the second recording medium has been completed; and said control means controlling the shifting means so that the reading means is shifted to a station at which information is read from the second reading medium in response to a signal from the completion detecting means upon completion of the driving operation of the first or the second recording medium.

37. The optical disk apparatus as defined in claim 20, further comprising:

discrimination means for discriminating whether the first recording medium in question is dedicated solely to reproduction use or is compatibly used for recording and reproduction, by contacting the first recording medium, the discrimination means being reciprocally moved by the shifting means in parallel with the rotation axis together with the reading means;

completion detecting means for detecting the fact that a driving operation of the first recording medium has been completed; and said control means controlling the discrimination-use shifting means so that the discrimination means is retreated to a station at which it is possible to prevent the discrimination means from contacting the second recording means when the completion detecting means has detected completion of the driving operation of the first recording medium.

38. The optical disk apparatus as defined in claim 20, further comprising:

discrimination means for discriminating whether the first recording medium in question is dedicated solely to reproduction use or is compatibly used for recording and reproduction, by contacting the first recording medium, the discrimination means being reciprocally moved by the shifting means in parallel with the rotation axis together with the reading means;

medium holding means for supporting and moving the first recording medium between a driving station at which the first recording medium is rotatively driven by the driving member and a take-out station at which the first recording medium is taken out of the optical disk apparatus;

holding-state detecting means for detecting the fact that the first recording medium is held by the medium holding means;

detection means for detecting the fact that the first recording medium is located at the driving station; and said control means controlling the discrimination-use shifting means so that when the holding-state detecting means and the detection means have detected that the first recording medium is located at the driving station, the discrimination means comes into contact with the first recording medium.

39. The optical disk apparatus as defined in claim 20, further comprising:

first detection means for detecting the fact that the first recording medium is placed on the driving member;

second detection means for detecting the fact that the second recording medium is placed on the driving member; and said control means controlling the shifting means so that when the first detection means and the second detection means have detected that both the first recording medium and the second recording medium are placed on the driving member, the shifting means enters a stopped state.

40. The optical disk apparatus as defined in claim 20, further comprising:

medium holding means for supporting and moving the first recording medium between a driving station at which the first recording medium is rotatively driven by the driving member and a take-out station at which the first recording medium is taken out of the optical disk apparatus;

first detection means for detecting the fact that the first recording medium is held by the medium holding means;

second detection means for detecting the fact that the second recording medium is placed on the driving member; and said control means giving a warning when the first detection means and the second detection means have respectively detected that the first recording medium is held by the medium holding means and that the second recording medium is placed on the driving member.

41. The optical disk apparatus as defined in claim 20, further comprising:

first-mode detection means for detecting the fact that the reading means has been moved to a first-mode station at which the first recording medium is scanned;

second-mode detection means for detecting the fact that the reading means has been moved to a second-mode station at which the second recording medium is scanned;

first detection means for detecting the fact that the first recording medium is placed on the driving member; and said control means including first control means for discriminating signals from the first-mode detection means and the second-mode detection means in response to a signal from the first detection means showing that the first recording medium is not placed on the driving member, and for controlling the shifting means so that when no detection is obtained as to the fact that the reading means has been moved to the second-mode station, the reading means is moved to the second-mode station.

42. The optical disk apparatus as defined in claim 41, further comprising:

second detection means for detecting the fact that the second recording medium is placed on the driving member; and said control means determining whether or not the reading means is located at the second-mode station in accordance with signals from the second detection means and the second-mode detection means in the case where the second recording medium is placed on the driving member, and for controlling the shifting means so that the reading means is moved to the second-mode station when no detection is obtained as to the fact that the reading means has been moved to the second-mode station.

43. The optical disk apparatus as defined in claim 15, wherein the first recording medium is housed in a cartridge case.

44. The optical disk apparatus as defined in claim 43, further comprising a base member for supporting and positioning the cartridge case when only the first recording medium out of the first recording medium and the second recording medium is supported by the top portion of the driving member.

45. The optical disk apparatus as defined in claim 44, wherein when the first recording medium is supported by the top portion of the driving member, a radial direction of the first recording medium is orthogonal to the rotation axis.

46. The optical disk apparatus as defined in claim 45, further comprising:

a first support member for supporting the reading means so as to allow the reading means to move in the radial direction;

said shifting means shifting the reading means in parallel with the rotation axis by moving the first support member in parallel with the rotation axis; and holding means for transmitting to the reading means a force to be applied to move the reading means in the radial direction, the holding means being geared to the reading means.

47. The optical disk apparatus as defined in claim 46, wherein when information is read from the first recording medium by the reading means, the base member and the reading means are simultaneously moved in parallel with the rotation axis by the shifting means.

48. The optical disk apparatus as defined in claim 46, wherein the first support member includes a guide shaft that is geared to the shifting means and disposed in parallel with the radial direction, the reading means being provided with a guide hole whereto the guide shaft is slidably inserted.

49. The optical disk apparatus as defined in claim 48, wherein the base member is provided with a protruding portion that is geared with the shifting means and that sticks out in parallel with the guide shaft.

50. The optical disk apparatus as defined in claim 49, wherein the shifting means includes two sliding plates that are disposed symmetrically with respect to the rotation axis, each sliding plate being provided with a first groove to which an end of the guide shaft is geared and a second groove to which the protruding portion is geared, the grooves being formed into shapes such that as the sliding plates are shifted in directions opposite to each other in parallel with the radial direction, the guide shaft and the protruding section are moved upward and downward vertically in the radial direction.

51. The optical disk apparatus as defined in claim 44, wherein the base member is shifted in parallel with the rotation axis by the shifting means together with the reading means, the base member being provided with a discrimination switch for discriminating whether the first recording medium in question is dedicated solely to reproduction use or is compatibly used for recording and reproduction, by contacting the first recording medium.

52. The optical disk apparatus as defined in claim 15, further comprising:

discrimination means for discriminating whether the first recording medium in question is dedicated solely to reproduction use or is compatibly used for recording and reproduction by contacting the first recording medium;

discrimination-use shifting means for reciprocally shifting the discrimination means in parallel with the rotation axis;

completion detecting means for detecting the fact that a driving operation of the first recording medium has been completed; and said control means controlling the discrimination-use shifting means so that the discrimination means is retreated to a station at which it is possible to prevent the discrimination means from contacting the second recording means when the completion detecting means has detected completion of the driving operation of the first recording medium.

53. The optical disk apparatus as defined in claim 52, further comprising:

a lower frame for housing the optical disk, the top of the lower frame being open; and a lid for covering the top of the lower frame, wherein the completion detecting means includes a closed-lid confirming switch for detecting an open or closed state of the lid.

54. The optical disk apparatus as defined in claim 15, further comprising:

medium holding means for supporting and moving the first recording medium between a driving station at which the first recording medium is rotatively driven by the driving member and a take-out station at which the first recording medium is taken out of the optical disk apparatus;

holding-state detecting means for detecting the fact that the first recording medium is held by the medium holding means;

first detection means for detecting the fact that the first recording medium is located at the driving station;

second detection means for detecting the fact that the second recording medium is placed on the driving member; and said control means controlling the shifting means so that when the holding-state detecting means and the first detection means have detected that the first recording medium is placed on the driving member and when the second detection means has detected that the second recording medium is not placed at the driving station, the reading means is moved to a station at which information is read from the first recording medium.

55. The optical disk apparatus as defined in claim 54, further comprising:

a lower frame for housing the optical disk apparatus, the top of the lower frame being open; and a lid for covering the top of the lower frame, the lid being attached to one end of the lower frame so as to freely pivot thereon, wherein the medium holding means, attached to a back face of the lid, allows the first recording medium to move to the driving station when the lid is closed, and the detection means includes a closed-lid confirming switch for detecting an open or closed state of the lid.

56. The optical disk apparatus as defined in claim 15, further comprising:

discrimination means for discriminating whether the first recording medium in question is dedicated solely to reproduction use or is compatibly used for recording and reproduction, by contacting the first recording medium;

discrimination-use shifting means for reciprocally shifting the discrimination means in parallel with the rotation axis;

medium holding means for supporting and moving the first recording medium between a driving station at which the first recording medium is rotatively driven by the driving member and a take-out station at which the first recording medium is taken out of the optical disk apparatus;

holding-state detecting means for detecting the fact that the first recording medium is held by the medium holding means;

detection means for detecting the fact that the first recording medium is located at the driving station; and said control means controlling the discrimination-use shifting means so that when the holding-state detecting means and the detection means have detected that the first recording medium is located at the driving station, the discrimination means comes into contact with the first recording medium.

57. The optical disk apparatus as defined in claim 56, further comprising:

a lower frame for housing the optical disk apparatus, the top of the lower frame being open; and a lid for covering the top of the lower frame, the lid being attached to one end of the lower frame so as to freely pivot thereon, wherein the medium holding means, attached to a back face of the lid, allows the first recording medium to move to the driving station when the lid is closed, and the detection means includes a closed-lid confirming switch for detecting an open or closed state of the lid.

58. The optical disk apparatus as defined in claim 15, further comprising:

discrimination means for discriminating whether the first recording medium in question is dedicated solely to reproduction use or is compatibly used for recording and reproduction, by contacting the first recording medium;

discrimination-use shifting means for reciprocally shifting the discrimination means in parallel with the rotation axis;

first detection means for detecting the fact that the first recording medium is placed on the driving member;

second detection means for detecting the fact that the second recording medium is placed on the driving member; and said control means controlling the discrimination-use shifting means so that when the first detection means and the second detection means have detected that both the first recording medium and the second recording medium are placed on the driving member, the discrimination means is retreated to a station at which it is possible to prevent the discrimination means from contacting the second recording means.

59. An optical disk apparatus comprising:

a driving member for driving a disc-shaped first recording medium with a top portion of the driving member contacting the circumferential edge of a first center hole of the first recording medium as well as for driving a disc-shaped second recording medium while contacting the circumferential edge of a second center hole of the second recording medium, the first center hole being arranged to have a diameter smaller than that of the second center hole, the driving member being provided with a rotation axis, the first and second recording media being simultaneously held by the driving member with the second recording medium being held by the driving member at a station which is different from the top portion of the rotation axis of the driving member during operation of the optical disk apparatus;

reading means for reading information by scanning either a recording surface of the first recording medium or that of the second recording medium;

shifting means for shifting the reading means in parallel with the rotation axis;

control means for controlling the shifting means so that when only the first recording medium is supported by the driving member, the reading means is shifted to a first reading position where the first recording medium is to be read, and so that except when only the first recording medium is supported by the driving member, the reading means is shifted to a second reading position where the second recording medium is to be read;

first detection means for detecting the fact that the first recording medium is placed on the driving member;

second detection means for detecting the fact that the second recording medium is placed on the driving member; and said control means controlling the shifting means so that when the first detection means and the second detection means have detected that both the first recording medium and the second recording medium are placed on the driving member, the reading means is moved to a station at which information is read from the second recording medium.

60. The optical disk apparatus as defined in claim 59, further comprising:

a lower frame for housing the optical disk, the top of the lower frame being open;

a lid for covering the top of the lower frame, the lid being attached to one end of the lower frame so as to freely pivot thereon, and medium holding means for holding the first recording medium, wherein the medium holding means, fixed to a back face of the lid, allows the first recording medium to be placed on the driving member when the lid is closed, and the first detection means includes a closed-lid confirming switch for detecting an open or closed state of the lid and a medium-detecting switch for detecting the fact that the recording medium is held by the medium holding means.

* * * * *